(12) United States Patent
Murase

(10) Patent No.: US 7,669,023 B2
(45) Date of Patent: Feb. 23, 2010

(54) POWER EFFICIENT STORAGE WITH DATA DE-DUPLICATION

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 391 days.

(21) Appl. No.: 11/822,856

(22) Filed: Jul. 10, 2007

(65) Prior Publication Data

US 2009/0019246 A1    Jan. 15, 2009

(51) Int. Cl.
*G06F 12/16*    (2006.01)
*G06F 1/32*    (2006.01)

(52) U.S. Cl. ........................ 711/162; 713/324
(58) Field of Classification Search ............. None
See application file for complete search history.

(56) References Cited

U.S. PATENT DOCUMENTS

| | | | |
|---|---|---|---|
| 6,807,632 B1 | 10/2004 | Carpentier et al. | 713/165 |
| 7,035,972 B2 | 4/2006 | Guha et al. | |
| 7,065,619 B1 | 6/2006 | Zhu et al. | 711/162 |
| 7,539,710 B1 * | 5/2009 | Haustein et al. | 707/204 |

OTHER PUBLICATIONS

Salman, David, Microsoft's Windows Storage Server 2003 R2 (Technical Overview L300), http://download.microsoft.com/download/8/3/b/83bf26f3-40bd-434a-a389-fbe39f9d726f/INF323.ppt, Jul. 10, 2007.

DataDomain, "DDX Array Series", http://www.datadomain.com/pdf/DataDomain-DDXArraySeries-Datasheet.pdf, Jul. 10, 2007.

DataDomain, "Operating System", http://www.datadomain.com/pdf/DataDomain-OS-Datasheet.pdf, Jul. 10, 2007.

DataDomain, "Controller Series", http://www.datadomain.com/pdf/DataDomain-DDXControllerSeries-Datasheet.pdf, Jul. 10, 2007.

* cited by examiner

*Primary Examiner*—Kevin Verbrugge
(74) *Attorney, Agent, or Firm*—Mattingly & Malur, P.C.

(57) ABSTRACT

Power consumption in a storage system is reduced by selectively controlling power supplied to the storage devices, while also incorporating a de-duplication function to reduce the amount of required storage capacity. First storage devices are initially in a powered on condition and second storage devices are in a powered off condition. Write data received by the controller is initially stored to a first volume allocated from the first storage devices. While the second storage devices are powered on, content of the write data stored in the first volume is compared with content of any existing data stored in a second volume allocated on the second storage devices. When results of the comparison show that the content of the write data does not match the content of the existing data, the write data is stored to the second volume.

20 Claims, 24 Drawing Sheets

Logical Element Structure

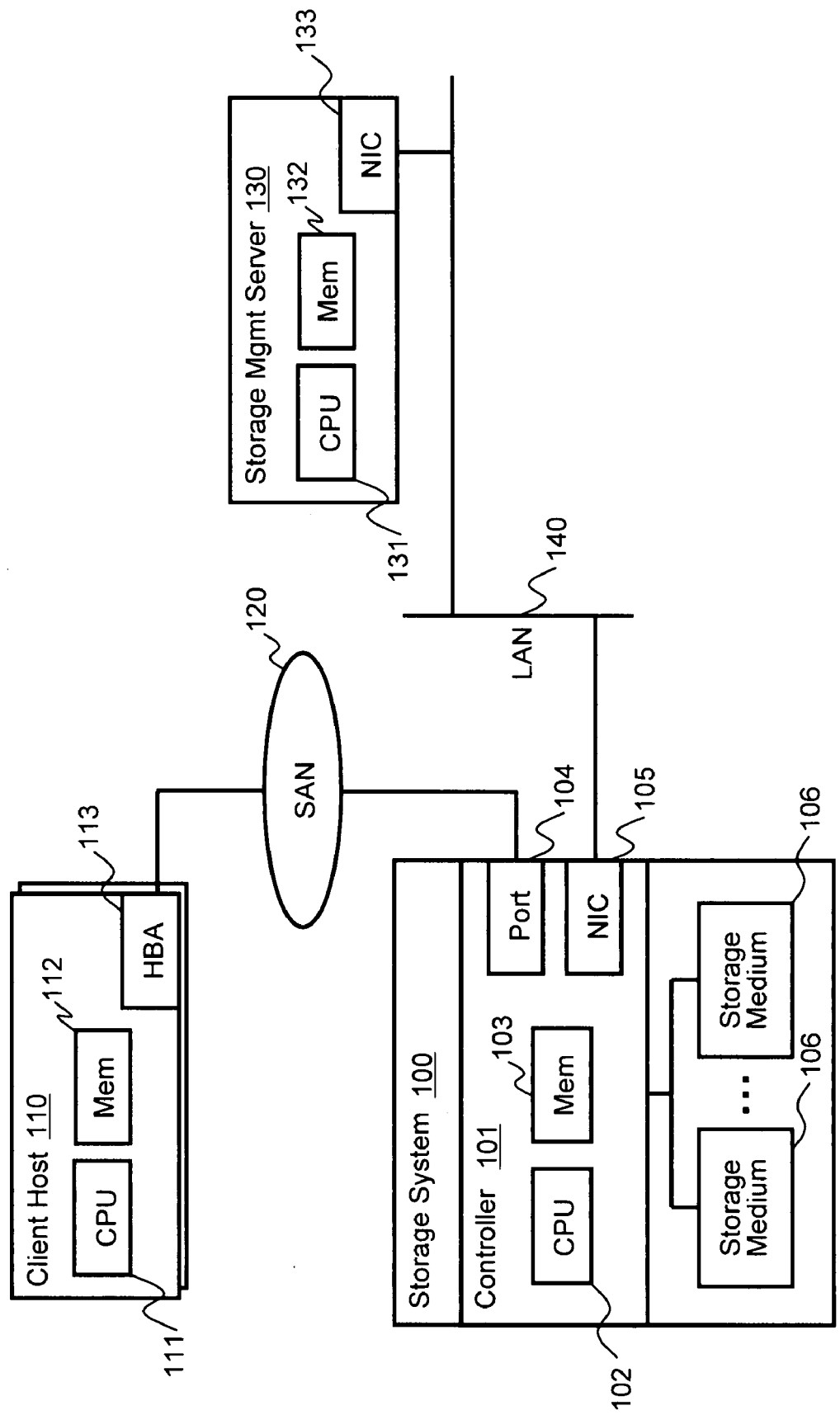
FIG. 1 Hardware Architecture

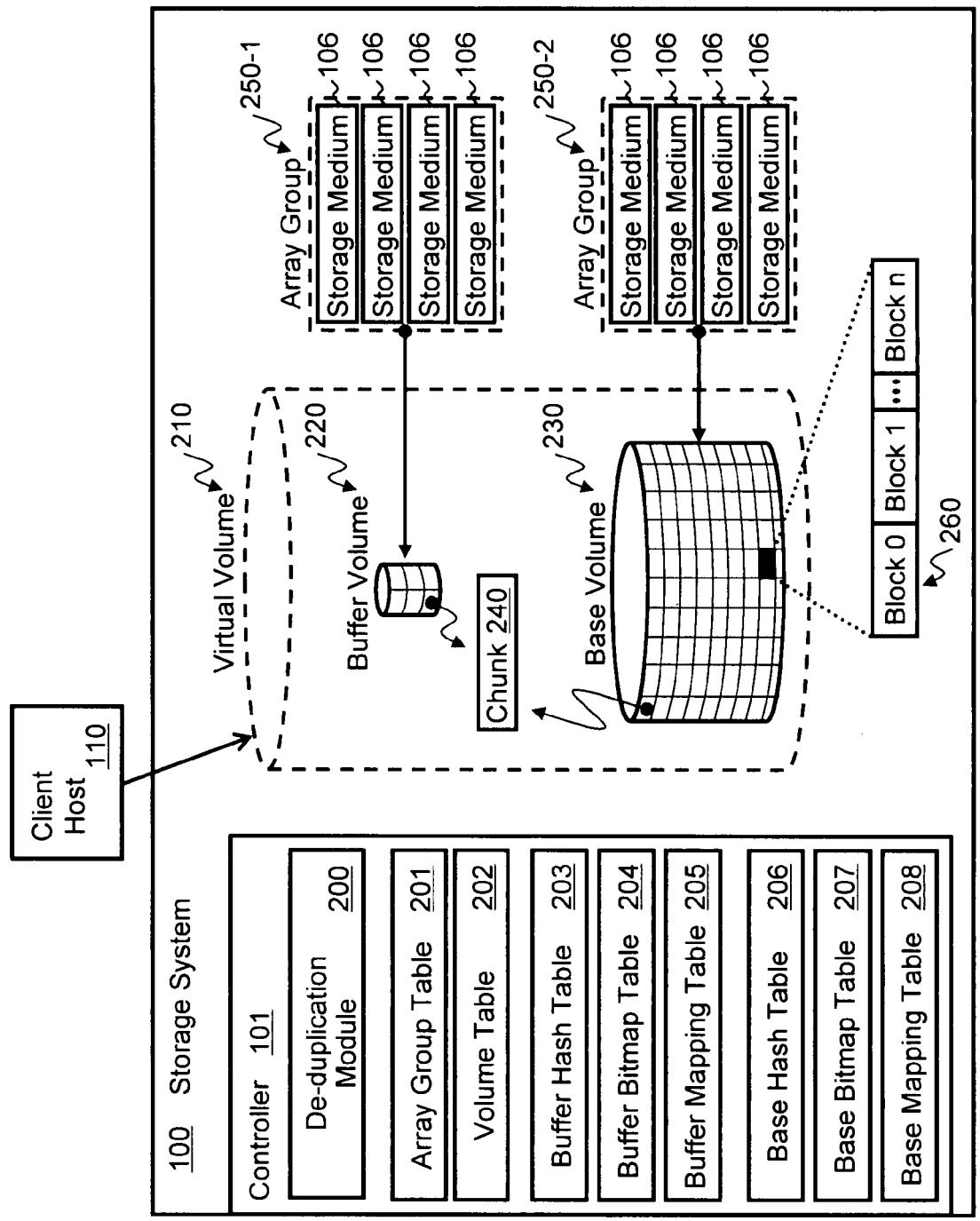
FIG. 2 Logical Element Structure

FIG. 3 Data Structure of Array Group Table

| Array Group ID | Medium ID |
|---|---|
| A1 | M1 |
| A1 | M2 |
| A1 | M3 |
| ... | ... |
| A2 | M7 |
| A2 | M8 |
| ... | ... |

FIG. 4 Data Structure of Volume Table

| Type | Volume ID | Array Group ID |
|---|---|---|
| Base | V1 | A1 |
| Buffer | V2 | A2 |

FIG. 5 Data Structure of Buffer and Base Hash Table

| Hash Value /710 | Chunk ID /720 |
|---|---|
| HV1 | Ch1 /791 |
| HV2 | Ch2 /792 |
| HV2 | Ch3 /793 |
| HV3 | Ch4 |
| ... | ... |

203, 206

FIG. 6 Data Structure of Buffer and Base Bitmap Table

| Chunk ID /810 | Start LBA /820 | Number of Blocks /830 |
|---|---|---|
| Ch1 | 0 | 32 /891 |
| Ch2 | 32 | 25 /892 |
| ... | ... | ... |

204, 207

| LBA | Chunk ID | Offset |
|---|---|---|
| 100 | Ch1 | 0 |
| 101 | Ch1 | 1 |
| ... | ... | ... |
| 120 | Ch5 | 0 |
| 121 | Ch5 | 1 |
| ... | ... | ... |

FIG. 7 Data Structure of Buffer and Base Mapping Table

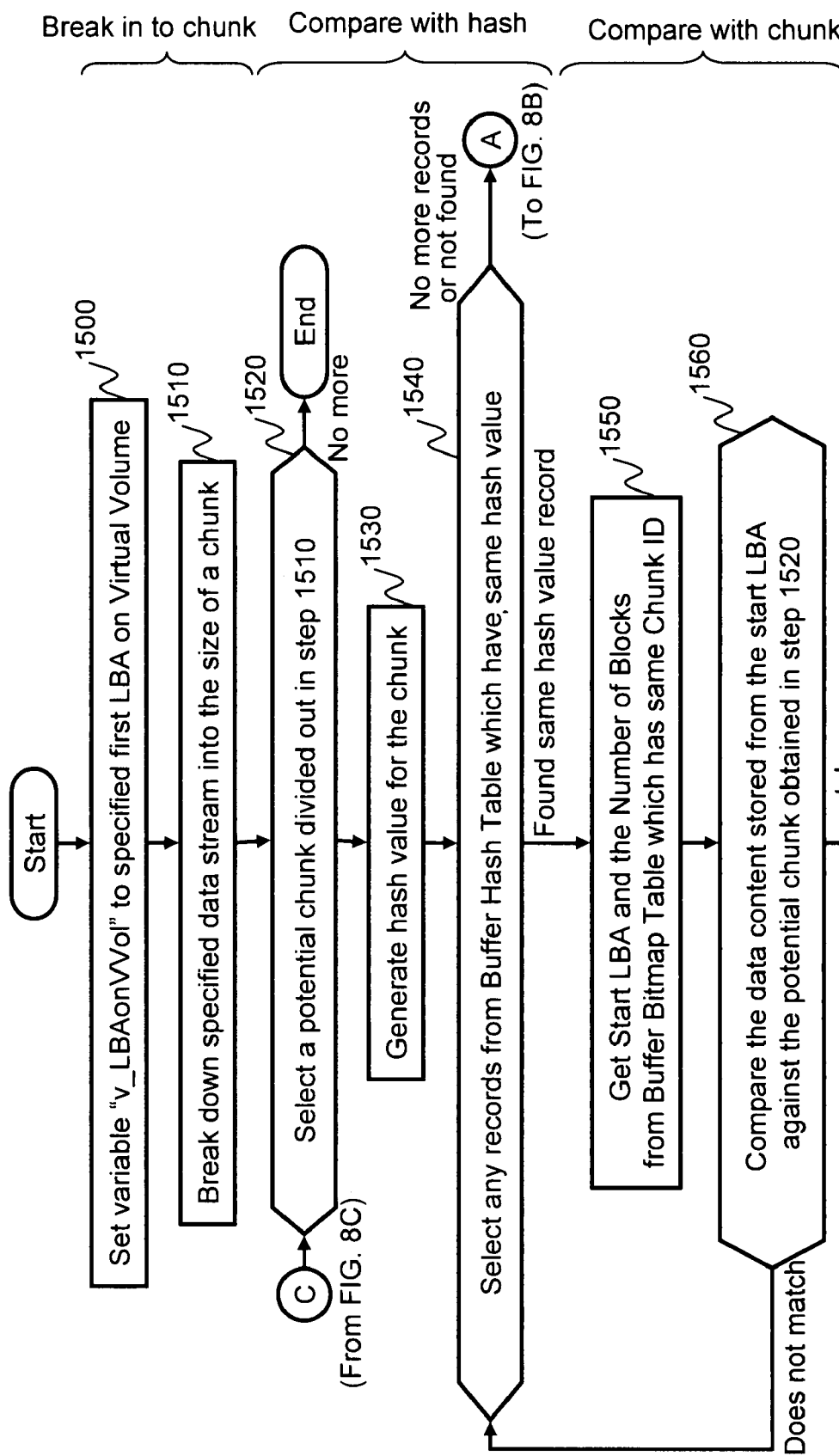
FIG. 8A Process to Write Data to Buffer Volume

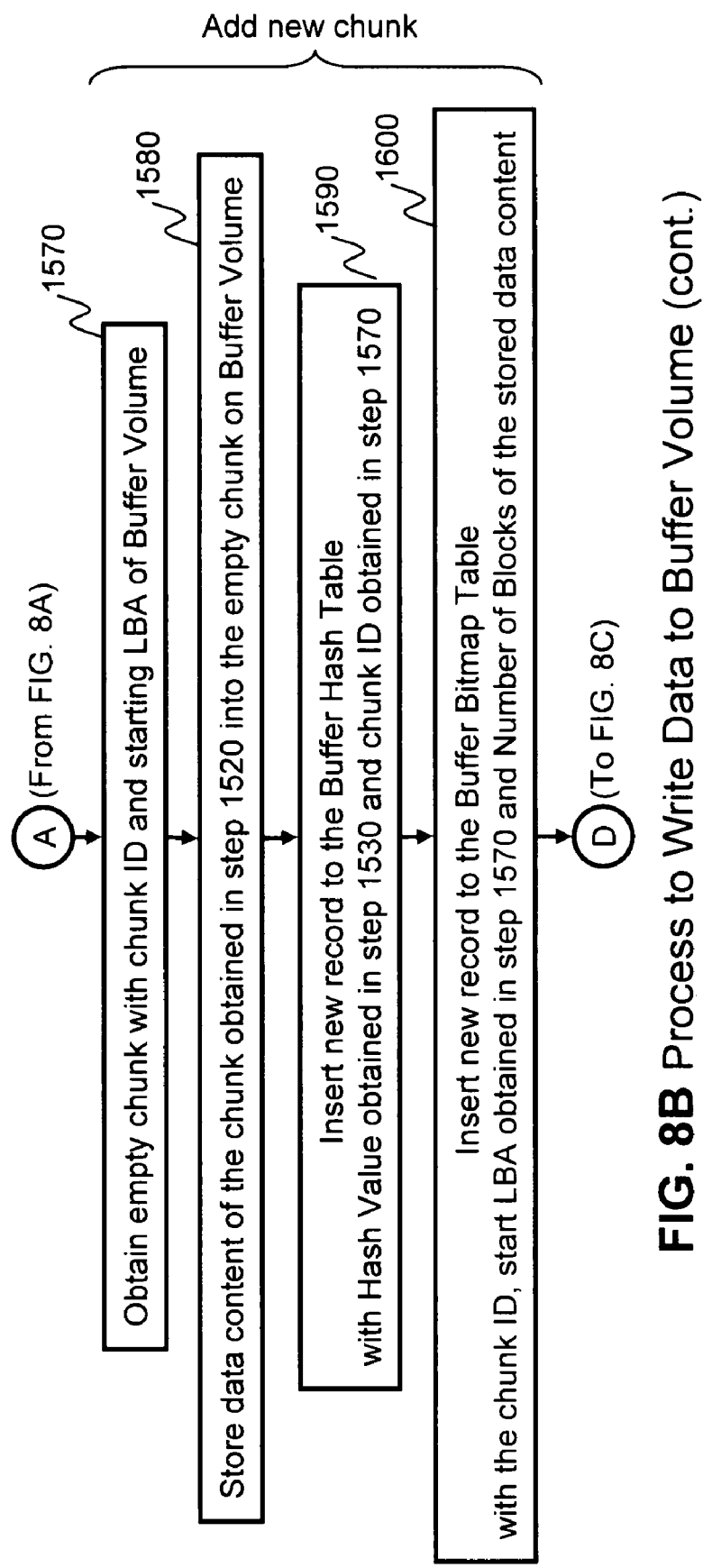
FIG. 8B Process to Write Data to Buffer Volume (cont.)

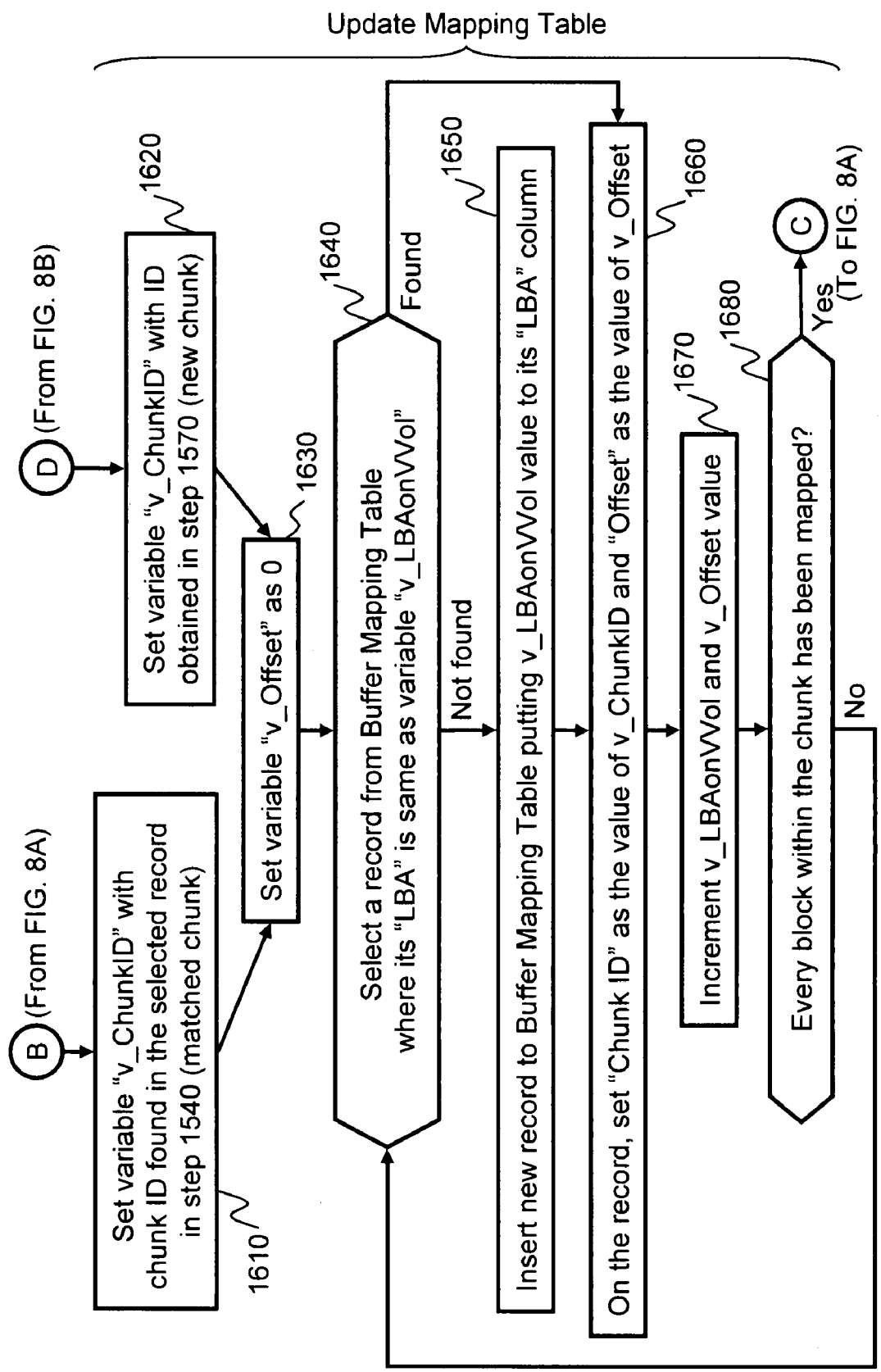
FIG. 8C Process to Write Data to Buffer Volume (cont.)

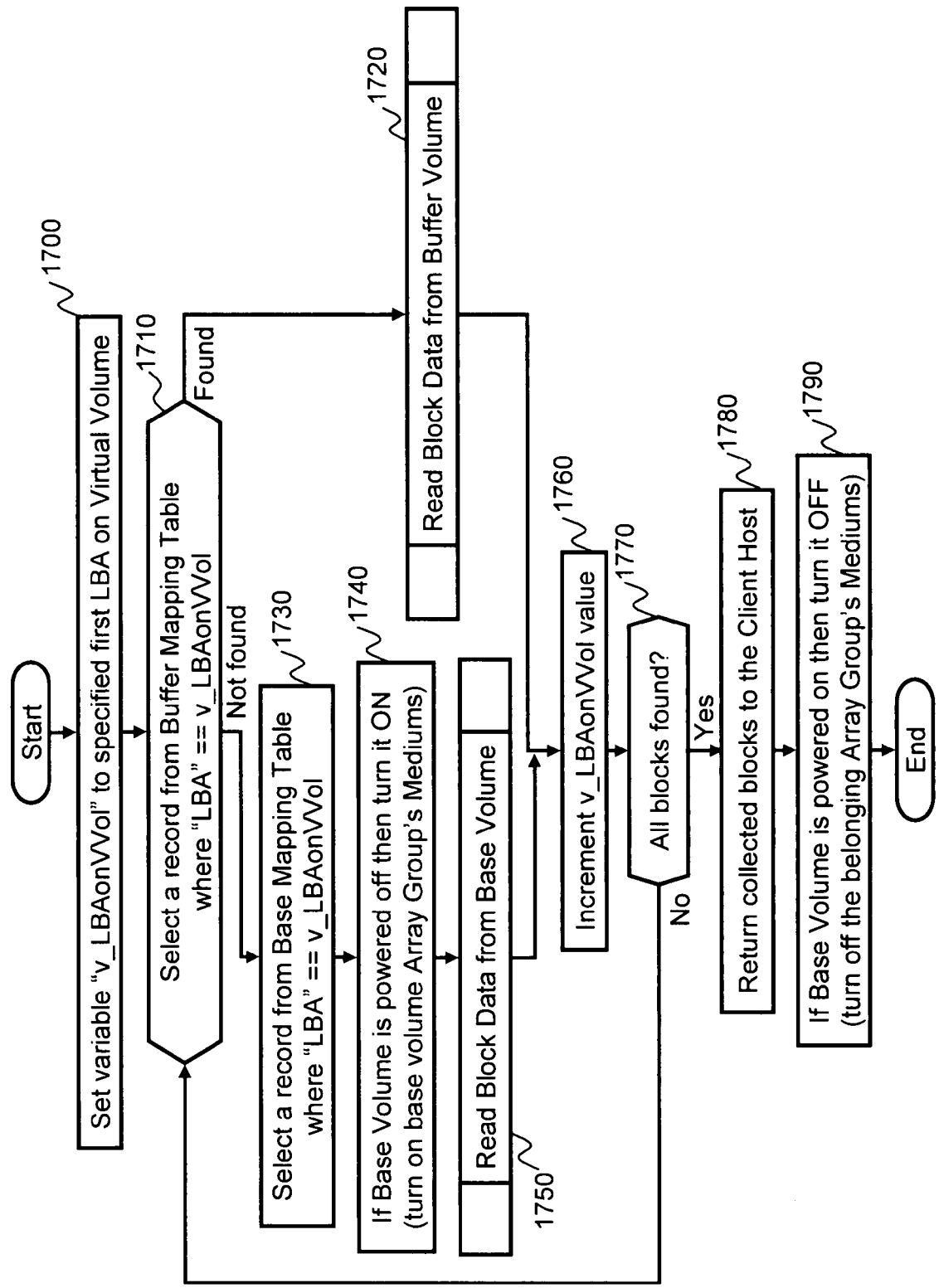
FIG. 9 Process to Read Data

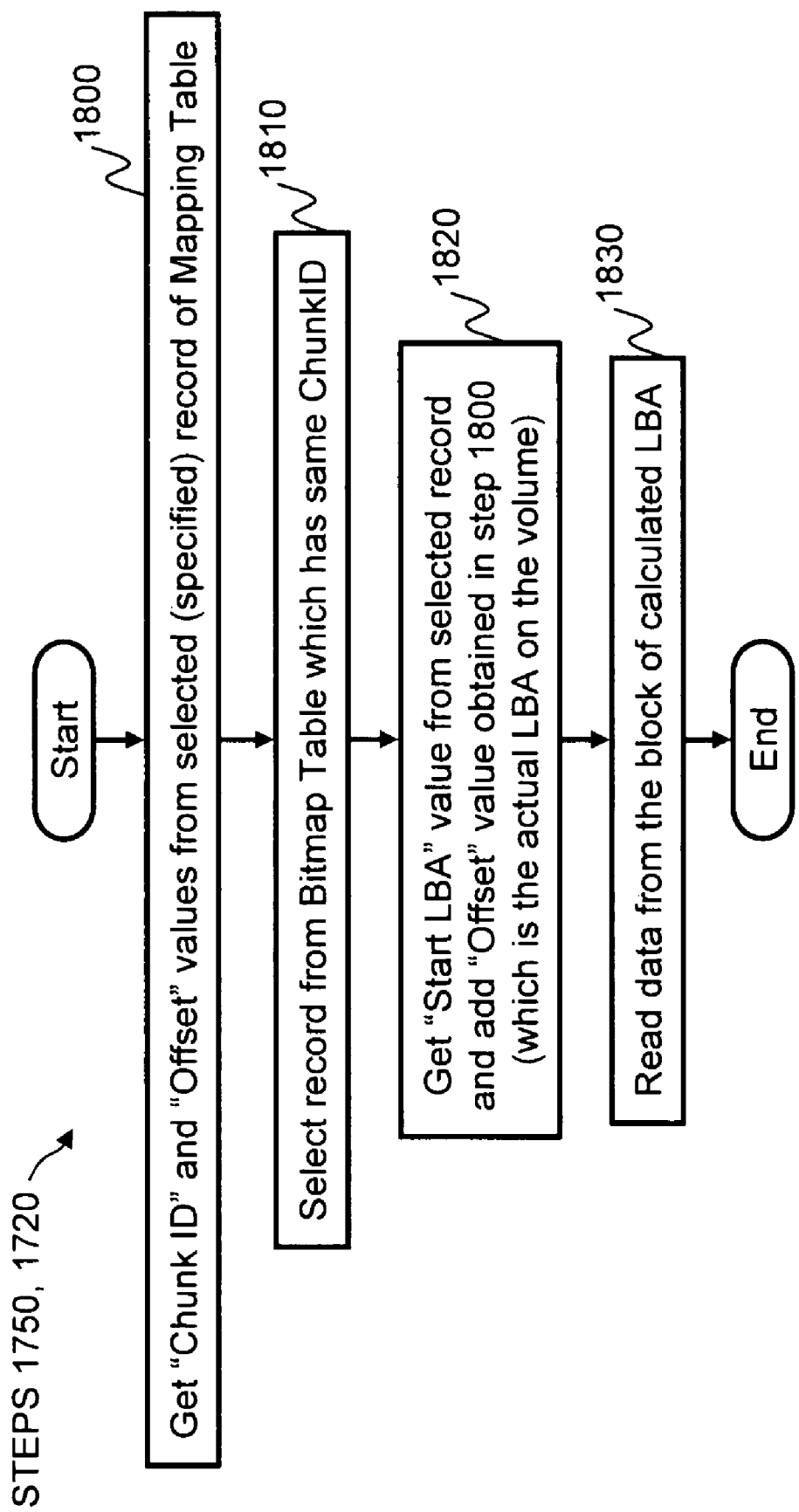
FIG. 10 Subroutine to Read Block Data from Specific Volume (Step 1720 and 1750 of FIG. 9)

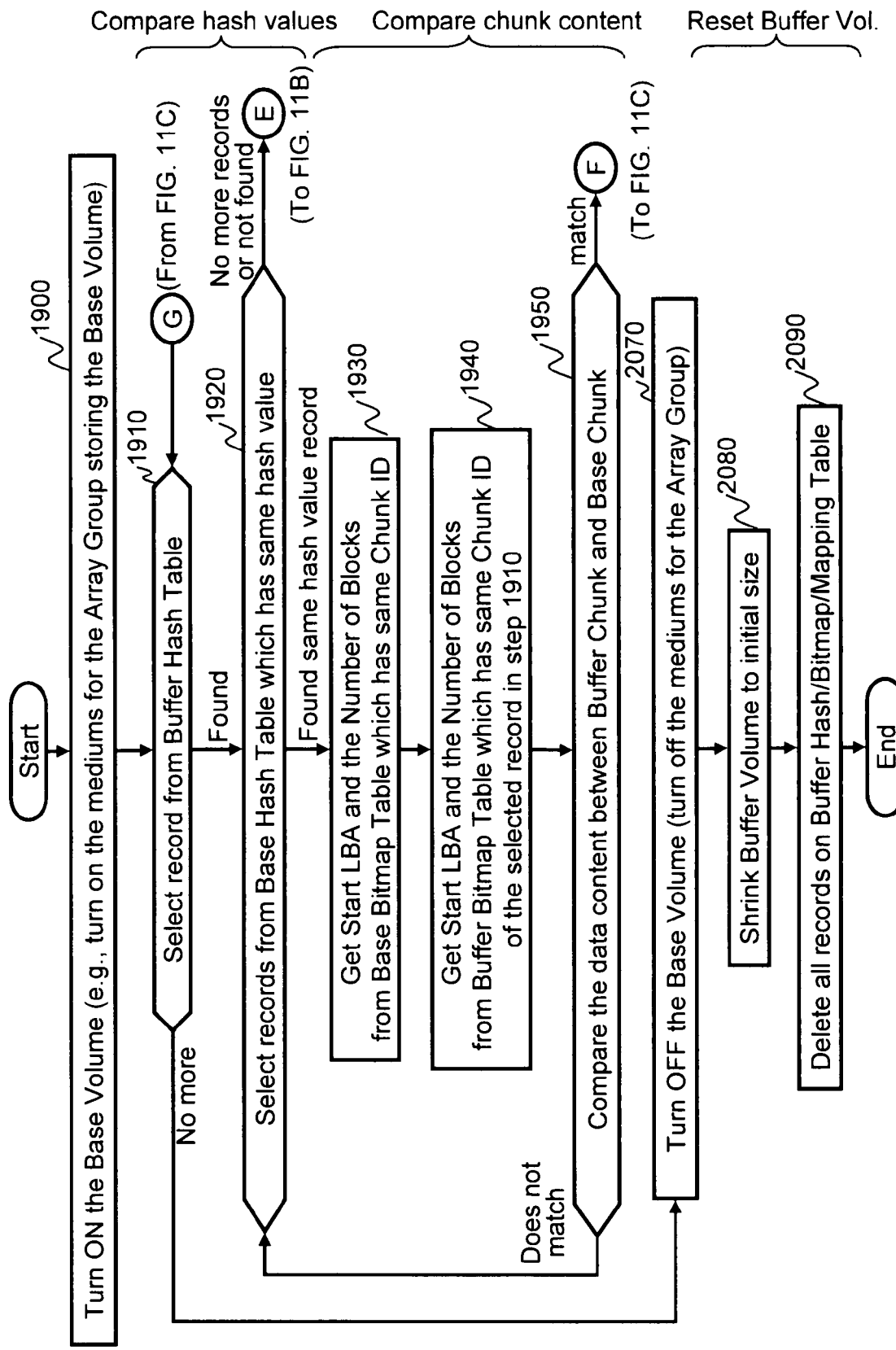
FIG. 11A Process to Flush Buffer

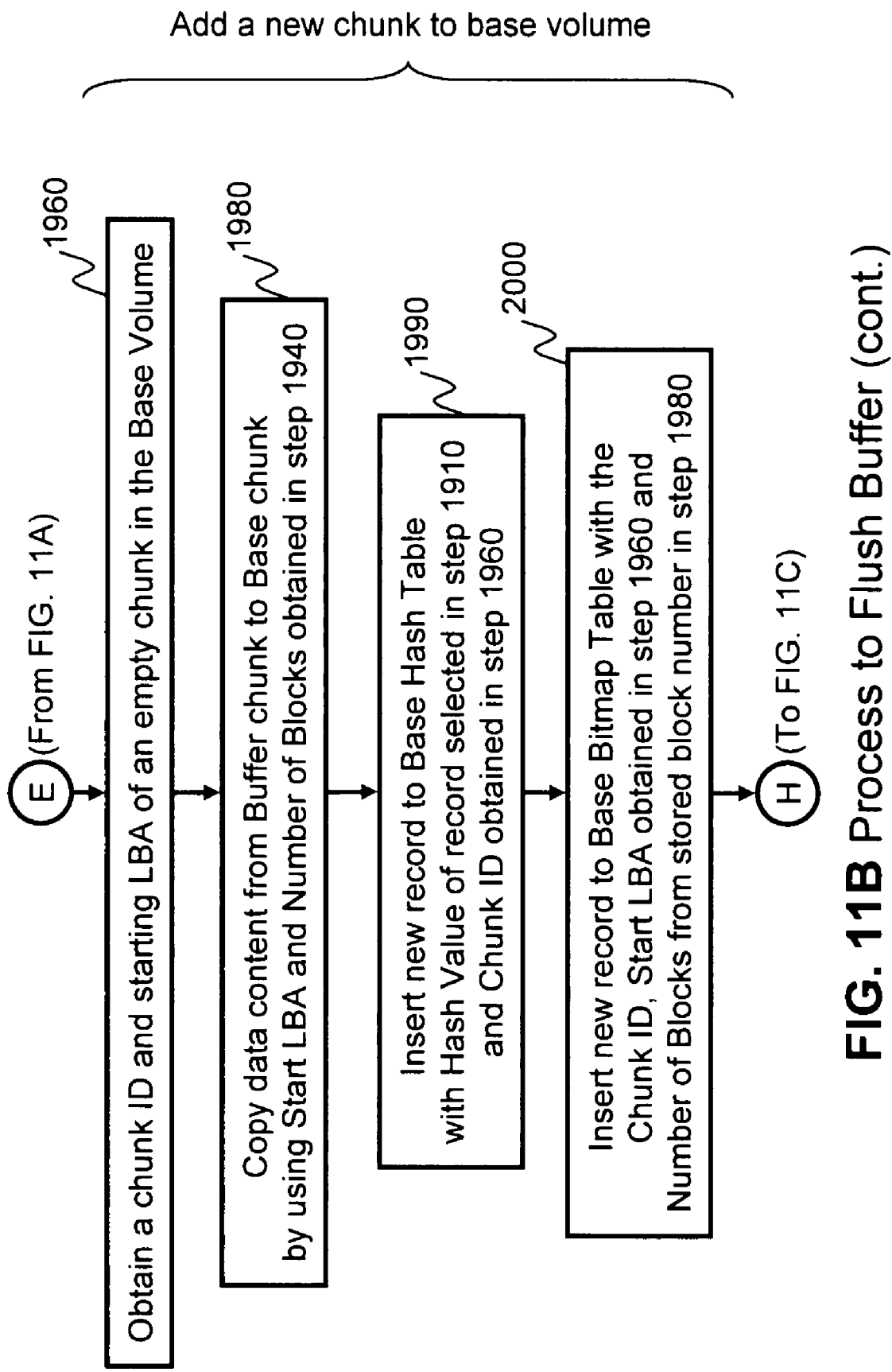
FIG. 11B Process to Flush Buffer (cont.)

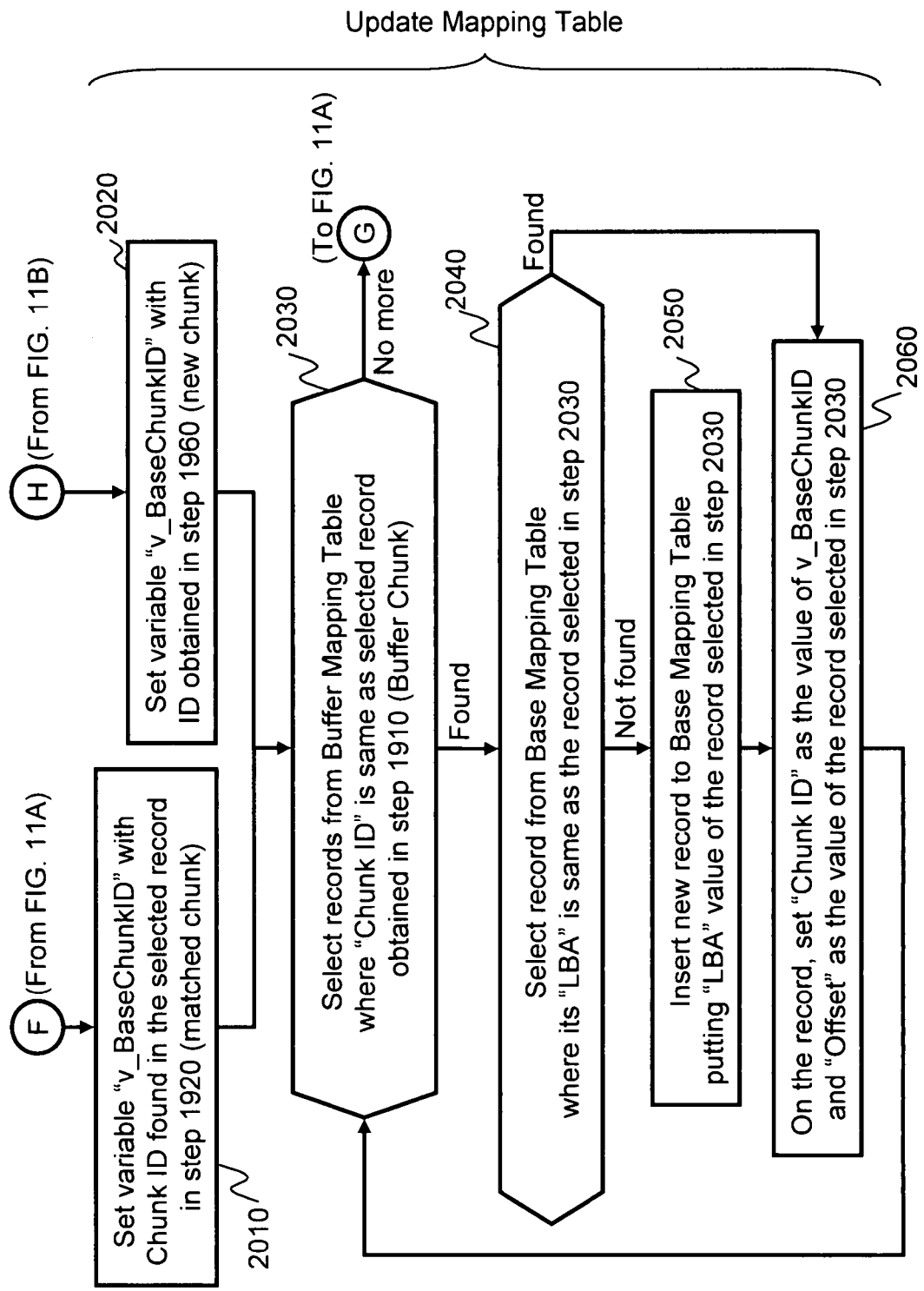
FIG. 11C Process to Flush Buffer (cont.)

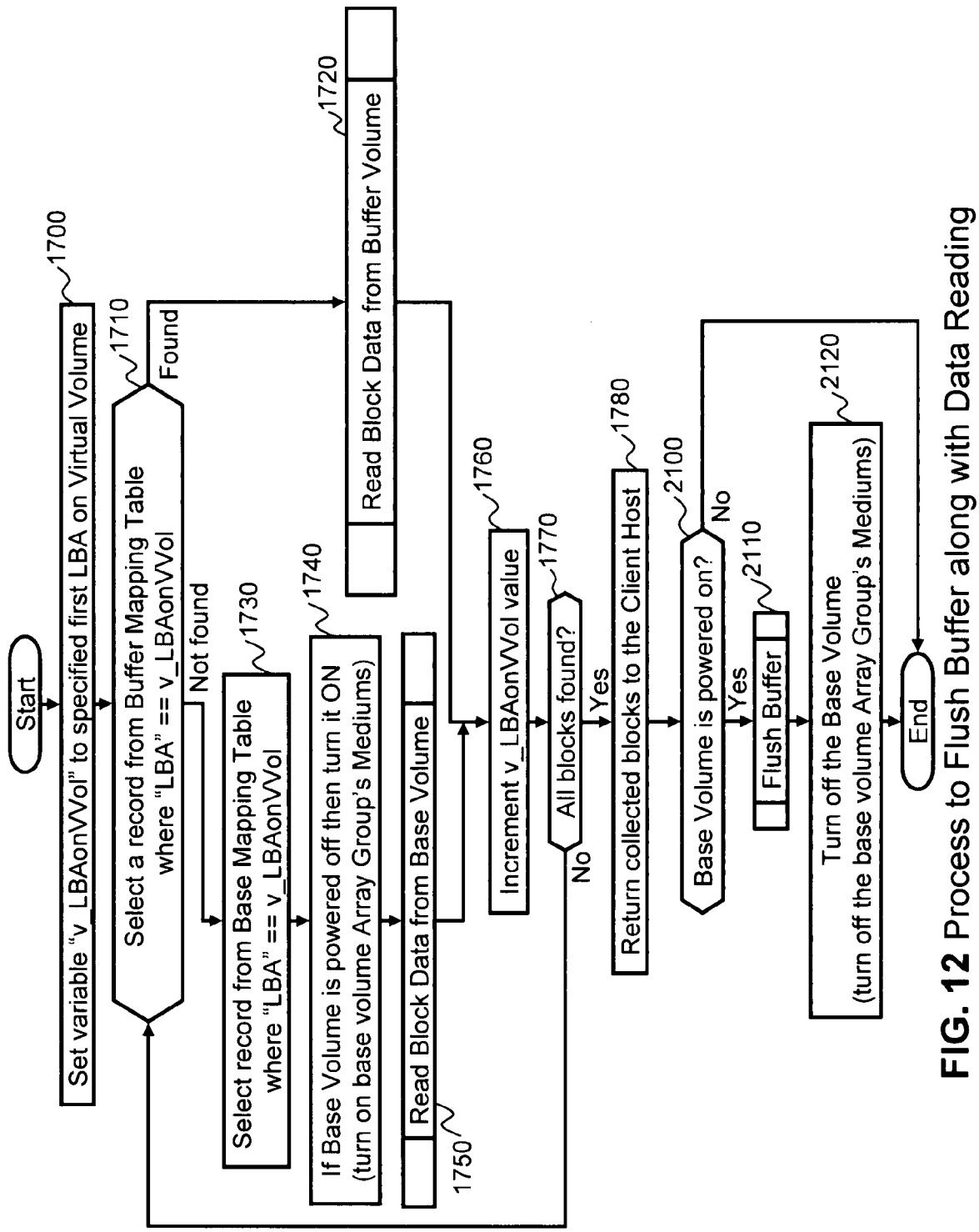
FIG. 12 Process to Flush Buffer along with Data Reading

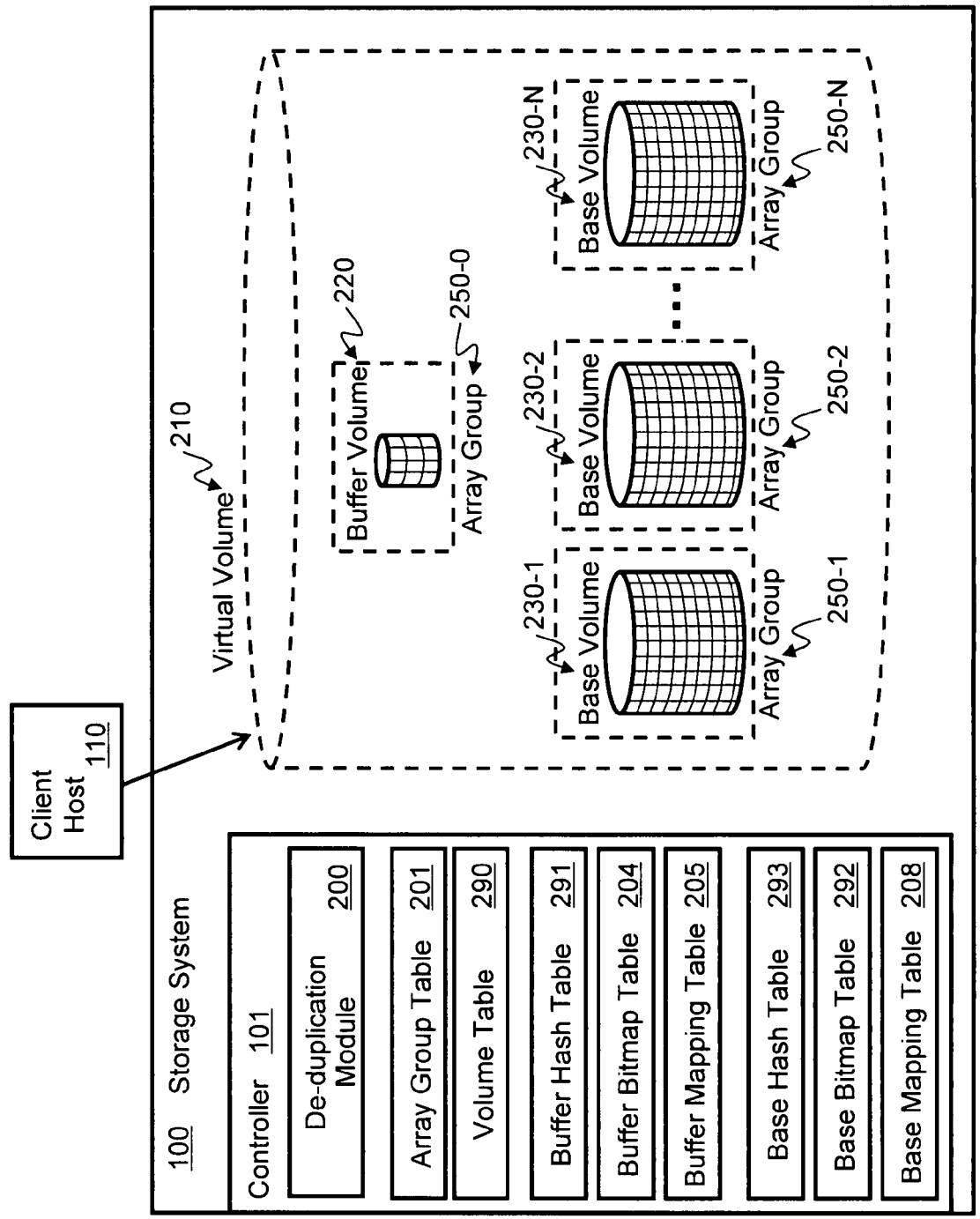
FIG. 13 Logical Element Structure

| Type | Volume ID | Array Group ID |
|---|---|---|
| Buffer | V0 | A0 |
| Base | V1 | A1 |
| Base | V2 | A2 |
| Base | V3 | A3 |
| ... | ... | ... |

FIG. 14 Data Structure of Volume Table

FIG. 15 Data Structure of Buffer and Base Hash Tables

| Hash Value | Chunk ID | Base Volume ID |
|---|---|---|
| HV1 | Ch1 | BV1 |
| HV2 | Ch2 | BV3 |
| HV2 | Ch2 | BV5 |
| HV3 | Ch3 | BV7 |
| ... | ... | ... |

FIG. 16 Data Structure of Base Bitmap Table

| Chunk ID | Base Volume ID | Start LBA | Number of Blocks |
|---|---|---|---|
| Ch1 | BV1 | 0 | 32 |
| Ch2 | BV1 | 128 | 25 |
| Ch3 | BV3 | 0 | 32 |
| ... | ... | ... | ... |

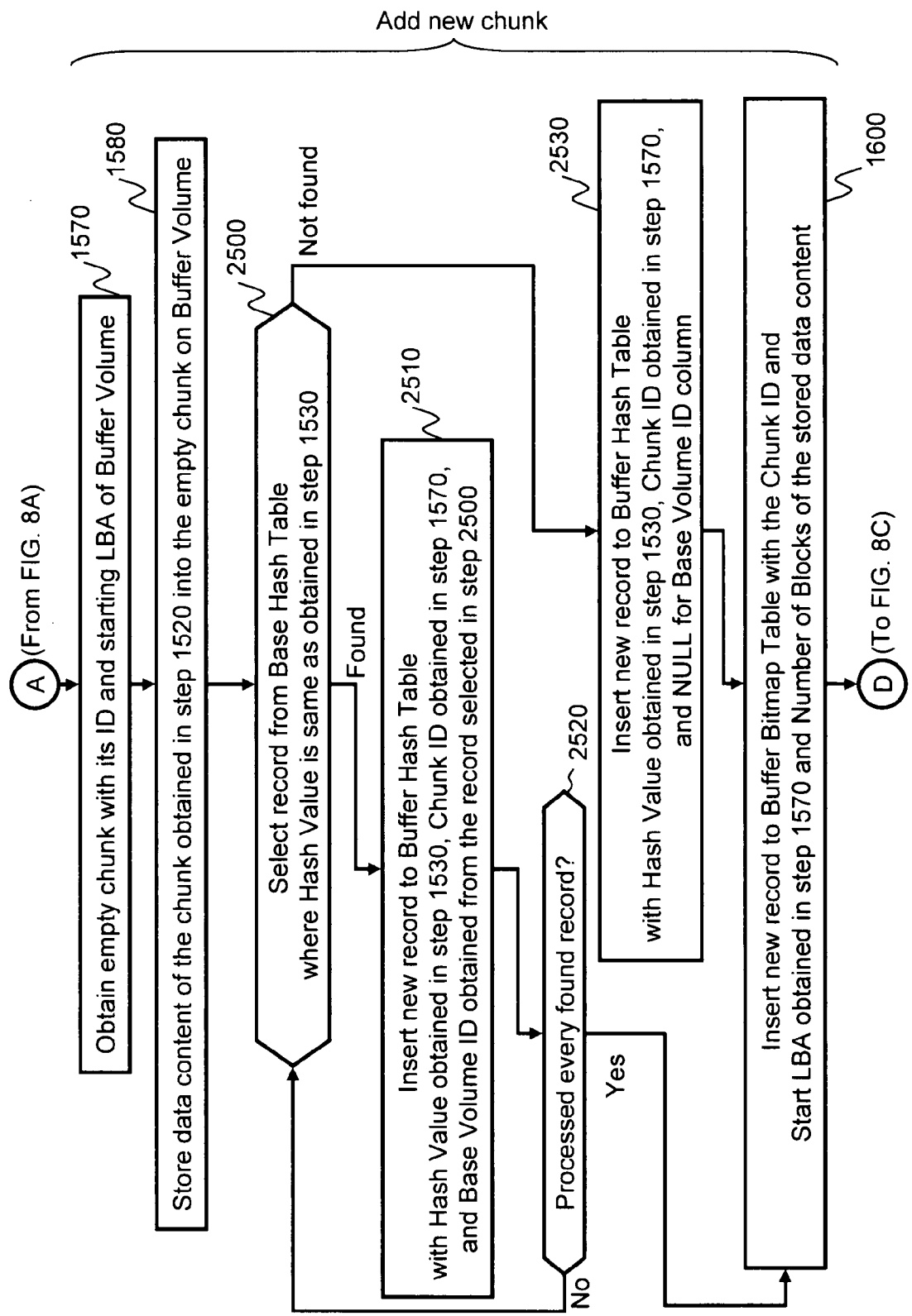
FIG. 17 Process to Write Data to Buffer Volume

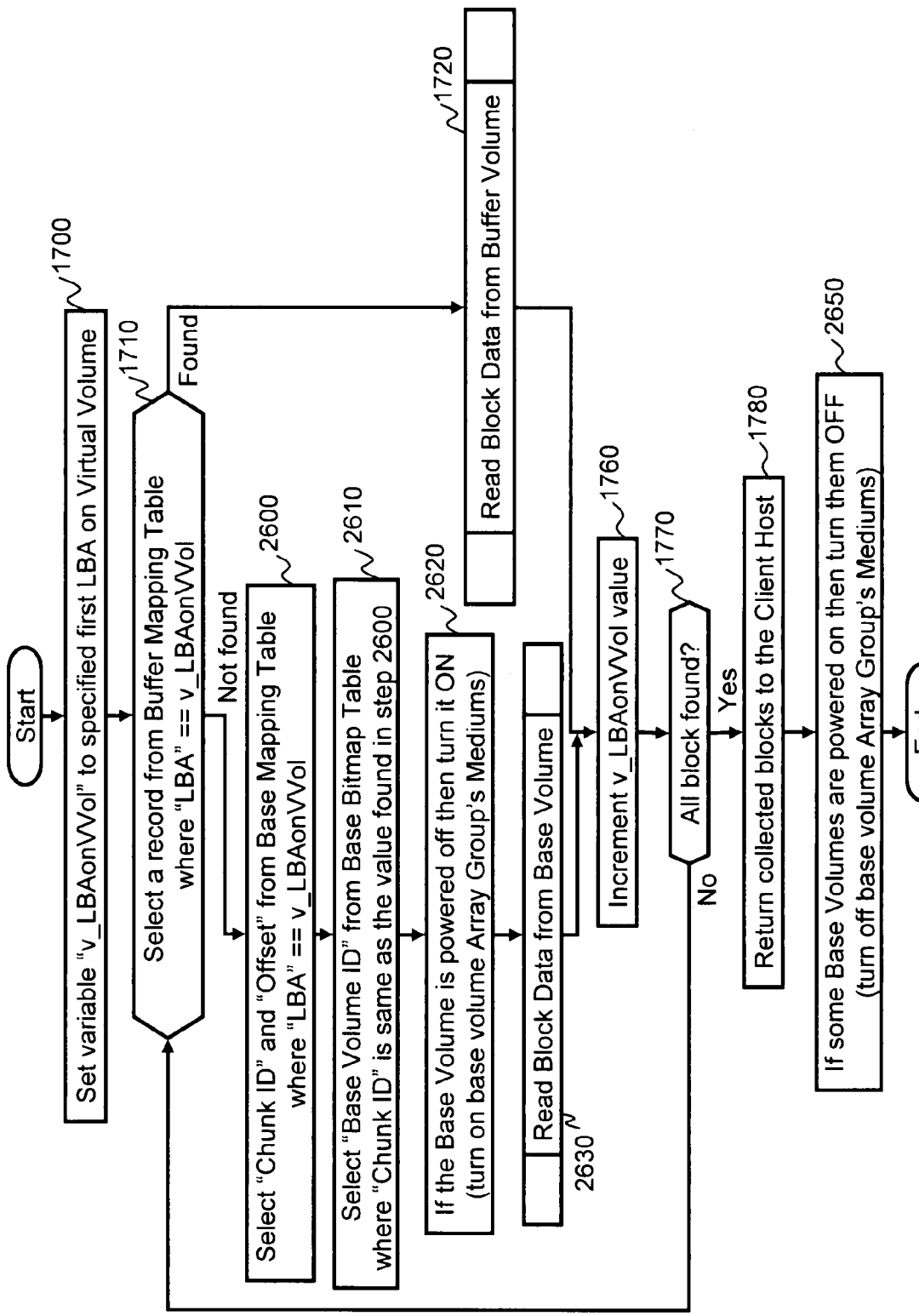
FIG. 18 Process to Read Data

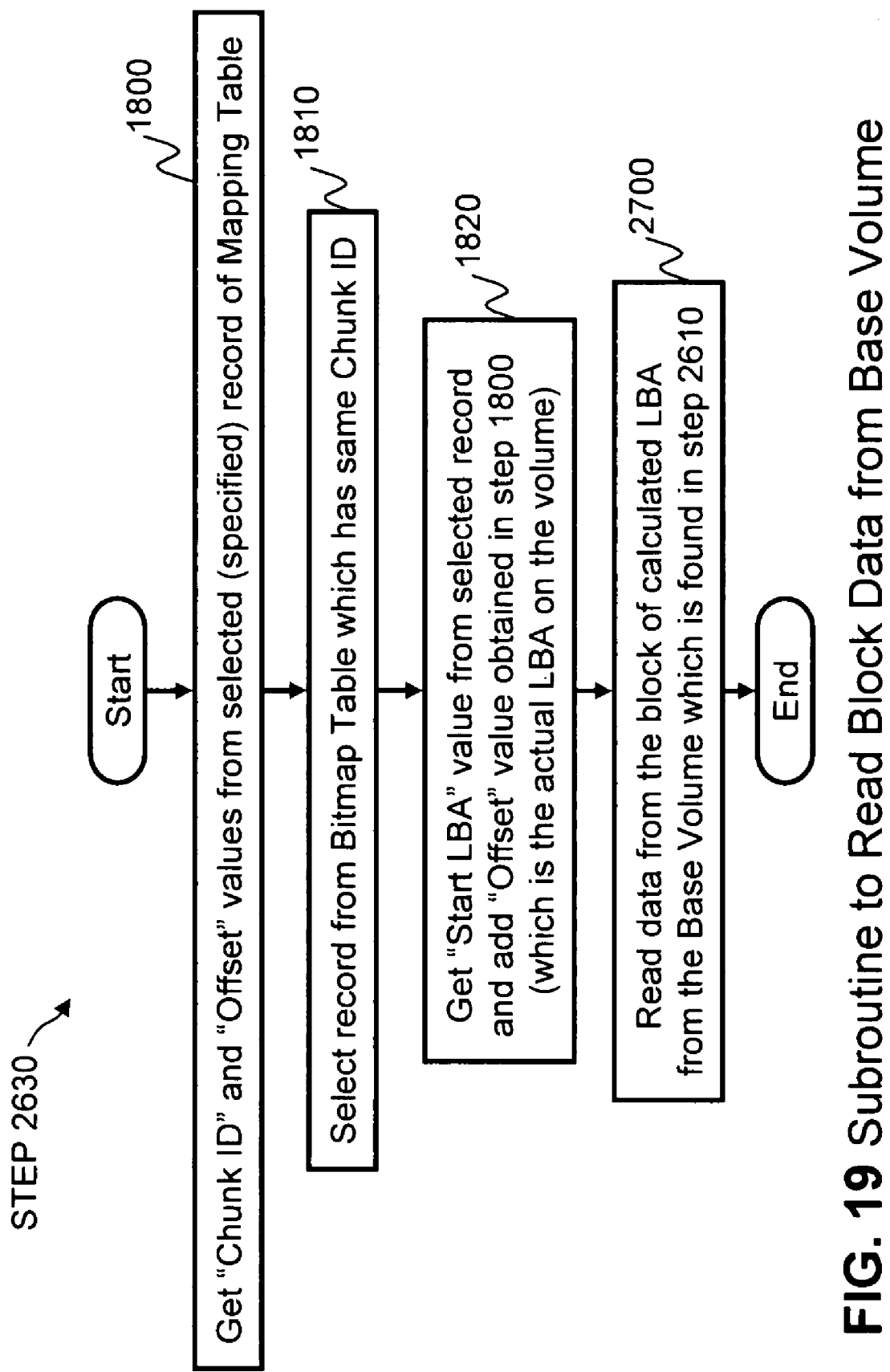
FIG. 19 Subroutine to Read Block Data from Base Volume

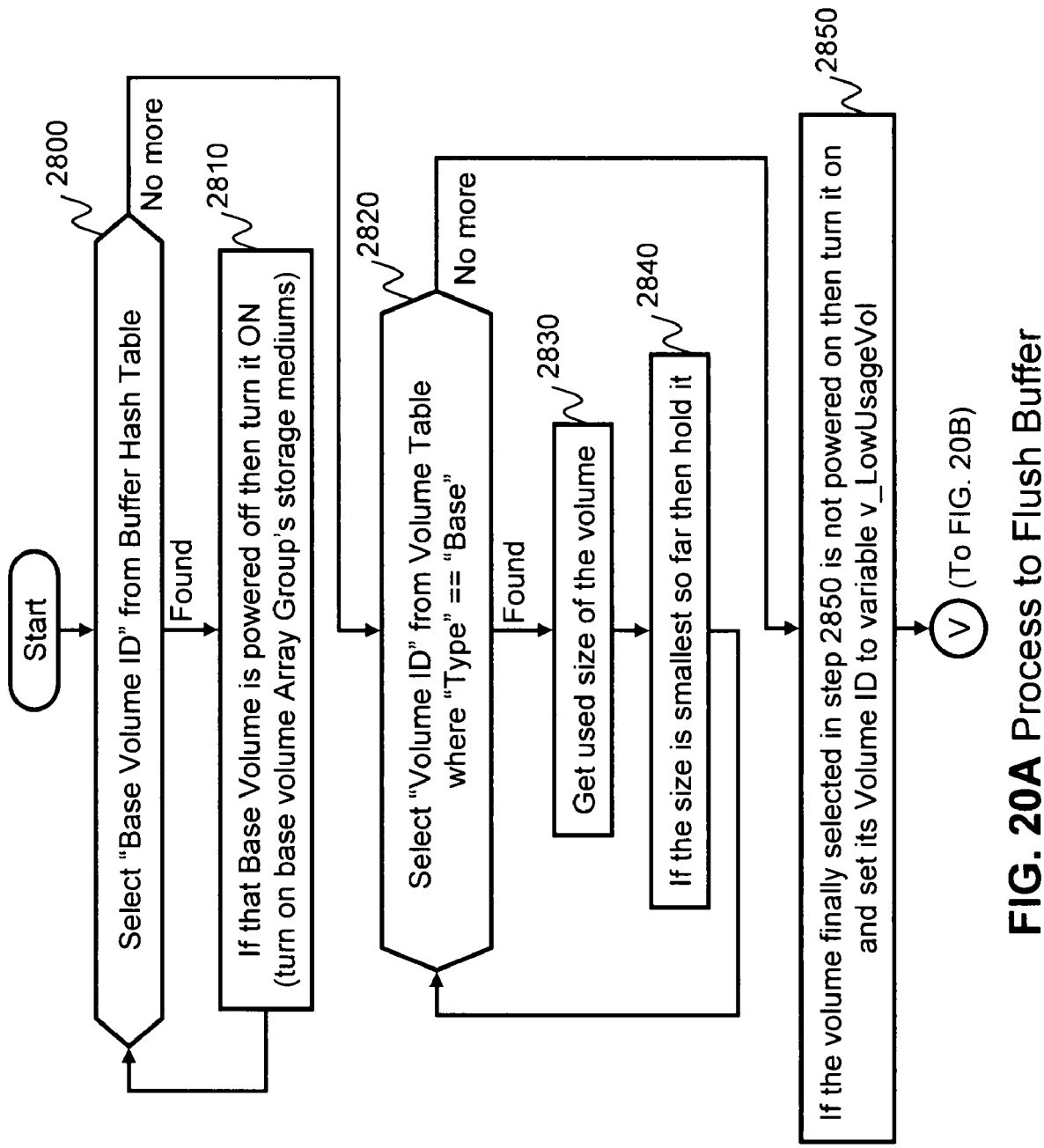
FIG. 20A Process to Flush Buffer

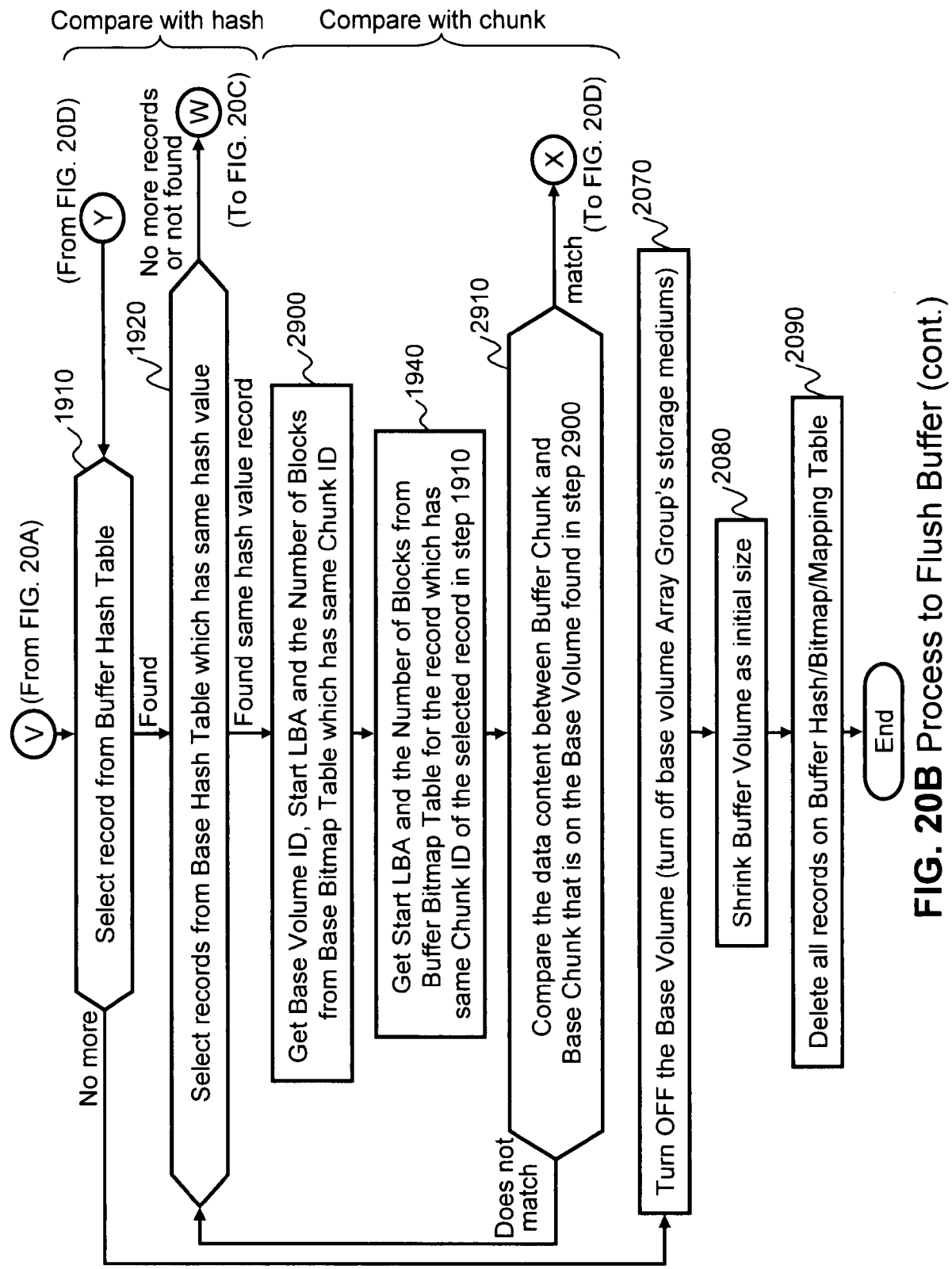
FIG. 20B Process to Flush Buffer (cont.)

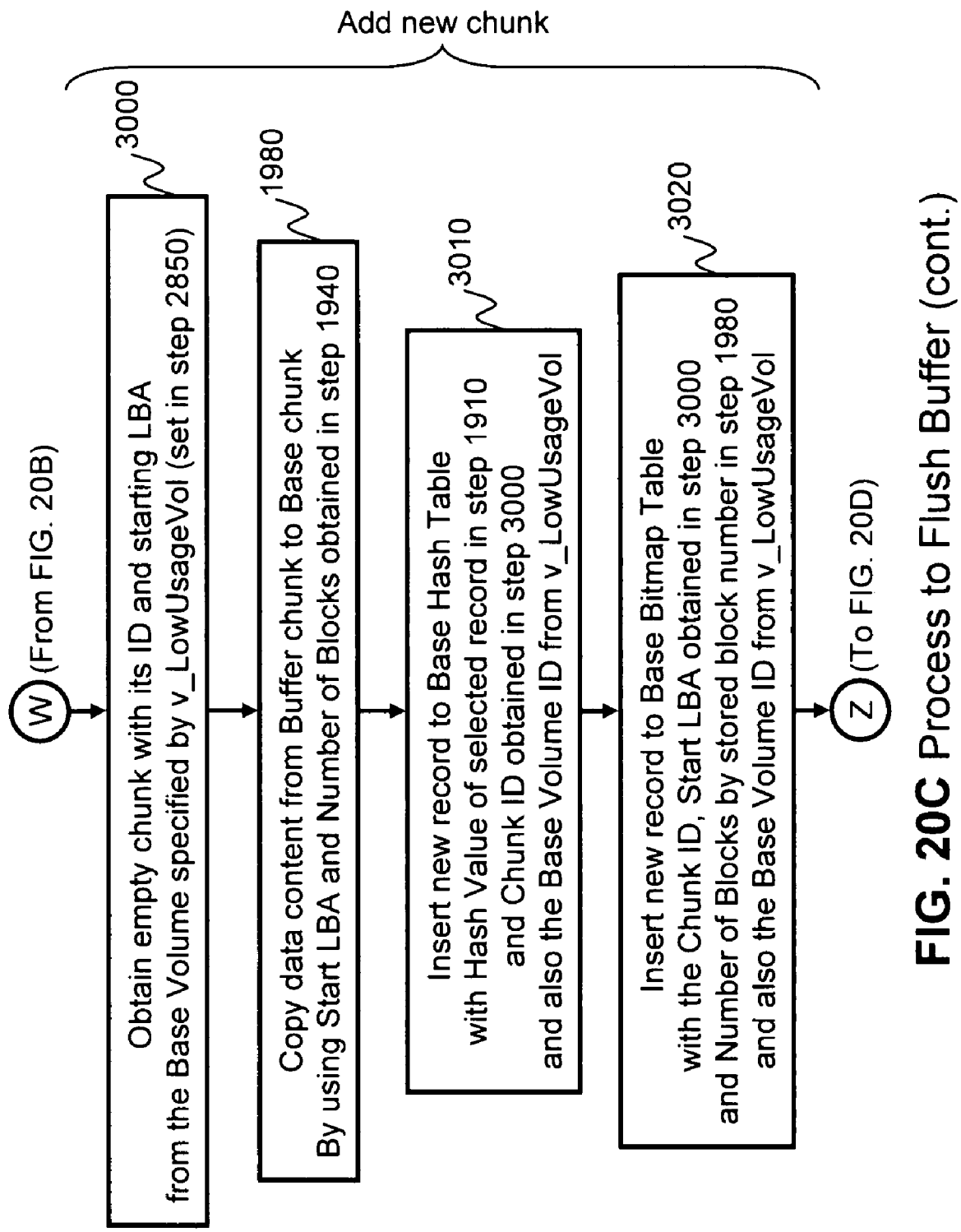
FIG. 20C Process to Flush Buffer (cont.)

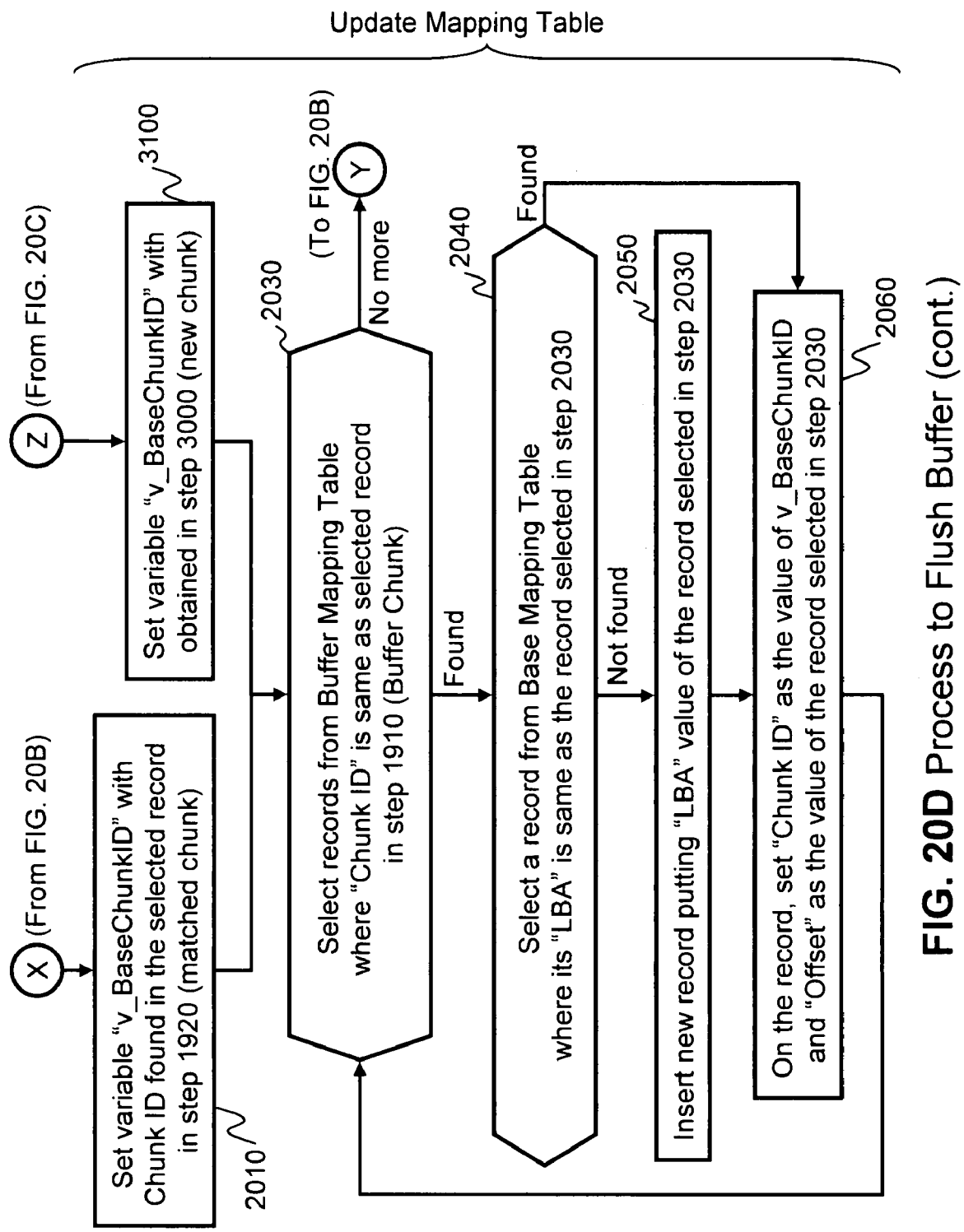
FIG. 20D Process to Flush Buffer (cont.)

POWER EFFICIENT STORAGE WITH DATA DE-DUPLICATION

BACKGROUND OF THE INVENTION

1. Field of the Invention

The present invention relates generally to reducing power and capacity consumption in storage systems.

2. Description of Related Art

According to recent trends in the storage industry, the amount of enterprise data is rapidly increasing, while information technology budgets are simultaneously being constrained. Thus, there is currently great interest in technologies for reducing the amount of data that must be stored. One such technology, data de-duplication, relies on the fact that a large amount of the data stored in a particular storage environment already has redundant portions also stored within that storage environment. During the data writing process, a typical de-duplication function will break down the data stream into smaller chunks of data and compare the content of each chunk of data to chunks previously stored in the storage environment. If the same chunk has already been stored, then the storage system will just make a new link to the already-stored chunk, rather than storing the new chunk which has same content. This function reduces the overall size of data stored in the storage environment, and thus, this technology has been adopted in many storage systems, such as in VTL (Virtual Tape Library) or CAS (Contents Addressed Storage) products. US Pat. Appl. Pub. No. 2005/0216669, entitled "Efficient Data Storage System", to Zhu et al., filed May 24, 2005, the entire disclosure of which is incorporated herein by reference, teaches a typical method for storing data with a de-duplication function.

Furthermore, due to the increases in the amount of data being stored, the power consumption required for storing data has also been increasing. Power consumed directly by storage devices and the associated cooling systems required for cooling the storage devices are becoming a significant factor in the cost of operating a data center. In addition, forecasts predict that in the near future, some datacenters may have insufficient power capacity due to the high-density of added equipment. Therefore, achieving greater power efficiency is becoming a critical issue to many datacenters. Accordingly, it would be desirable to reduce the amount of power required for operating the storage devices in a data center, and thereby reduce the overall cost of operation for the data center. It would further be desirable to reduce power consumption while also reducing the amount of data to be stored, such as through use of de-duplication technology discussed above. However, the prior art does not teach or suggest any technology for reducing power consumption in a storage system while simultaneously storing data more efficiently by performing de-duplication processing on the data.

BRIEF SUMMARY OF THE INVENTION

The invention reduces power consumption in a storage system by selectively controlling power supplied to the storage devices, while also incorporating a de-duplication function to reduce the amount of required storage capacity in the storage environment. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1 illustrates an example of a hardware configuration in which the method and apparatus of the invention may be applied.

FIG. 2 illustrates an example of a logical configuration of the invention applied to the architecture of FIG. 1.

FIG. 3 illustrates an exemplary data structure of an array group table.

FIG. 4 illustrates an exemplary data structure of a volume table.

FIG. 5 illustrates an exemplary data structure of a hash table.

FIG. 6 illustrates an exemplary data structure of a bitmap table.

FIG. 7 illustrates an exemplary data structure of a mapping table.

FIGS. 8A-8C illustrate a process for writing data to the buffer volume.

FIG. 9 illustrates a process for reading data according to the invention.

FIG. 10 illustrates a process to read block data from a specific volume.

FIGS. 11A-11C illustrate a process for flushing the buffer volume to the base volume.

FIG. 12 illustrates a second embodiment of the invention that includes a process for flushing the buffer volume to the base volume during a data reading process.

FIG. 13 illustrates a logical configuration of the invention in the third embodiments.

FIG. 14 illustrates an exemplary data structure of a volume table in third embodiments of the invention.

FIG. 15 illustrates an exemplary data structure of a hash table in the third embodiments.

FIG. 16 illustrates an exemplary data structure of a base bitmap table in the third embodiments.

FIG. 17 illustrates a process for writing data to the buffer volume in the third embodiments.

FIG. 18 illustrates a process for reading data in the third embodiments.

FIG. 19 illustrates a process for reading block data from the base volume in the third embodiments.

FIGS. 20A-20D illustrate a process for flushing the buffer volume to the base volume in the third embodiments.

DETAILED DESCRIPTION OF THE INVENTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

Embodiments of the invention disclose methods and apparatuses for providing a de-duplication solution to address the explosion in the amount of data being stored in certain industries, and embodiments of the invention also introduce a disk power control technology that reduces the amount of power consumed by storage devices. The inventor has determined that in certain storage environments, a large amount of data being stored is backup or archived data that does not need to be accessed frequently, and in fact, a large amount of data is stored and never accessed again. The invention takes advantage of this phenomenon by determining optimal situations in which to turn off the disk spindles where the storage devices do not have to be active all the time, thereby reducing the power consumption of the storage devices. Furthermore, de-duplication technology is increasingly being adopted in storage systems used in the highly growing areas of data backup and archiving. However, because de-duplication technology continuously compares the content of new incoming data chunks with the content of previously-stored data chunks, the volumes or disks, which may be of huge size, always need to be powered on for this purpose. This is necessary since any of the previously-stored chunks may need to be directly compared with the new incoming chunk on a bit-to-bit basis, and there is no guarantee that a specific portion of the data stored on a disk will not need to be used for the comparison during any certain time of period.

The storage system disclosed in this invention exposes a virtual volume as an apparent storage resource to a client host as a target of the client host input/output (I/O) operations. The virtual volume of the invention is actually composed of two separate types of logical volumes, namely, a buffer volume and base volume; but the virtual volume is represented to the client host as if the virtual volume is a single volume that the host is able to access. Thus, both the buffer volume and the base volume are target volumes for storing data chunks that are consolidated by a de-duplication function. However, the base volume of the invention is used for holding entire unique chunks that have been stored against the storage devices in the storage system, while the buffer volume of the invention is used for holding chunks temporarily that have been recently requested to be stored by the client host.

Power supply for the base volume (i.e., power to the one or more storage devices making up the base volume) is normally in the powered off condition. Thus, most of the storage devices in the storage system will not normally be consuming power. When the client host requests data to be written to the virtual volume, a de-duplicating module will perform the de-duplication process by utilizing the buffer volume. The data included in any write requests will be stored to the buffer volume temporarily, and during the temporary storage period the base volume remains powered off. When a flush command is received (such as when triggered by a storage administrator, at the time of a data read request, or by some other trigger mechanism), the de-duplicating module turns on the power for the storage devices containing the data of the base volume and merges the chunks stored on the buffer volume with the base volume using de-duplication technology, thereby concurrently performing a de-duplication process. After completion of the merging of the chunks, the de-duplication module turns off the power supply to the base volume and initializes the chunks on the buffer volume and related tables. Thus an advantage of the invention is to reduce power consumption on a storage system by controlling the storage device power supply, while utilizing a de-duplication function on the system to reduce the amount of storage capacity required at the same time. Having multiple layers of volumes for storing de-duplication chunks, and integrating power supply control of the base volume with the chunk flushing process, enables a large portion of the storage devices to be powered off most of the time, which can lead to conservation of a good amount of energy. Various example embodiments of the invention are described below with reference to the drawings.

First Embodiments

Hardware Architecture

FIG. 1 illustrates an example of a physical hardware architecture of an information system of the first embodiments. The information system of these embodiments consists of a storage system 100, one or more client hosts 110 and a storage management server 130. Client hosts 110 and storage system 100 are connected for communication through a SAN 120 (Storage Area Network). Further, while a SAN is illustrated, the connection could be any of a variety of types of connections, such as a local area network (LAN), wide area network (WAN), direct connection, or the like. Also storage management server 130 and storage system 100 are connected for communication through a LAN 140, which also could be any alternative connection type.

Storage system 100 includes a controller 101 for controlling access to a plurality of storage devices, such as storage mediums 106. Controller 101 includes a CPU 102, a memory 103, a port 104 for connecting with SAN 120 and a network interface (NIC) 105 for connecting with LAN 140. Storage mediums 106 are connected for communication with controller 101, and may be hard disk drives in the preferred embodiment, but in other embodiments could alternatively be any of a variety of other types of storage devices, such as flash memory, optical disks, tapes, and the like.

Each client host 110 may be a computer that includes a CPU 111, a memory 112, and a host bus adapter (HBA) 113 for connecting client host 110 with SAN 120. Client host 110 is able to act as a terminal computer for a storage service user.

Storage management server 130 may be a computer server that includes a CPU 131, a memory 132, and a network interface card (NIC) 133 for communicating with LAN 140. Storage management server 130 is able to act as a terminal computer for enabling a storage administrator to manage the storage system 100.

Logical Element Structure

FIG. 2 illustrates a software and logical element structure of the first embodiments. Storage mediums 106 are logically configured into multiple array groups 250, such as array groups 250-1, 250-2, which can then be used to make up the logical storage capacity for forming one or more logical volumes from each array group. Further, each array group 250 is composed of plural physical storage mediums 106 which are preferably configured into a RAID (redundant array of independent disks) group, or the like. For example, a plurality of storage mediums 106 could be composed as a RAID 5 array in which any three disks out of four store data and the remaining disk stores parity information. Other RAID configurations may also be used, or alternatively, the invention may be practiced without RAID protection.

A buffer volume 220 and a base volume 230 comprise logical storage extents whose storage capacity is carved from array groups 250-1 and 250-2, respectively. Thus, in FIG. 2, buffer volume 220 is a logical storage area generated from the physical storage provided by array group 250-1, such that data stored to buffer volume 220 is physically stored in the storage mediums 106 that are used to configure array group 250-1. Similarly, base-volume 230 is a logical storage area generated from array group 250-2, wherein data stored to base volume 230 is physically stored in the storage mediums 106 that make up array group 250-2. According to the invention, the storage mediums 106 that make up array group 250-1 are different from the storage mediums 106 that make up array group 250-2, and use a separately controllable power supply for powering the storage mediums, so that the storage mediums 106 making up array group 250-2 may be powered off for extended periods of time to conserve energy, while the storage mediums 106 making up array group 250-1 are able to remain powered on. In a preferred embodiment, the storage mediums 106 making up array group 250-2 may be located in a separate array enclosure from those making up array group 250-1, which may enable the entire enclosure to be powered off so that energy required for cooling can also be conserved (although it should be noted that the invention is not limited to such a configuration).

Both buffer volume 220 and base volume 230 are able to store data chunks 240. A chunk 240 is a portion of data that client host 110 has requested storage system 100 to store. However, since the de-duplication module 200 consolidates chunks that have same pattern of bytes during the data writing process, each chunk 240 that is stored has a unique content, at least within the respective volume (i.e., buffer volume 220 or base volume 230). In a preferred embodiment, a chunk is composed of plural storage blocks 260, with each chunk being made up of the same number of blocks. The maximum number of blocks 260 within a chunk is limited, but not all of the blocks in a chunk need to be filled with data.

Base volume 230 holds chunks that have been requested to be store from the client host from the commencement of the volume to a certain point in time. According to the invention, base volume 230 is turned off most of the time to conserve energy (i.e., the storage mediums making up base volume 230 are powered off). During the time that base volume 230 is powered off, buffer volume 220 temporarily stores any chunks that have been recently requested to be stored to virtual volume 210. From the client host perspective both buffer volume and base volume are encapsulated by virtual volume 210, the client host views the virtual volume 210 as if there is a single normal storage volume (i.e., logical unit) existing on the storage system 100. Thus, client host 110 writes data against and reads data from the virtual volume 110, and the controller 101 on the storage system manages the buffer volume 220 and the base volume 230 to respond to the requests from the client host while also performing energy conservation and data de-duplication according to the invention.

Software on the Controller

Storage controller 101 includes a de-duplication module 200, which is a software program according to the invention that provides de-duplication service to the client host 110, and that also controls the power supply to base volume 230. De-duplication module 200 and other software of the invention is stored in a computer readable medium, such as memory 103, for execution by CPU 102. De-duplication module 200 accepts read and write requests directed to virtual volume 210 by the client host. When a data write request is received, de-duplication module 200 breaks the write data down into one or more chunks 24 and compares these chunks to any chunks 240 already stored on the buffer volume 220. If a match to an existing chunk is not found, then the chunk is a new data pattern, and de-duplication module 200 stores the new chunk to the buffer volume 220. When a data read request is received, de-duplication module 200 collects chunks from the buffer volume 220 or base volume 230 which make up the requested data, concatenates the collected chunks together in the proper order as a single data stream and returns the requested data to the client host. When the storage administrator sends a flush command to the storage system the de-duplication module 200 will turn on the power for the base volume 230 and merge the chunks stored on the buffer volume 220 to the base volume 230 by concurrently performing the de-duplication process. After the completion of merging of the chunks from the buffer volume to the base volume, de-duplication module 200 turns of the power supply to the base volume and initializes the chunks on the buffer volume and related tables.

Also illustrated in FIG. 2, are a plurality of tables that are used in carrying out the invention. An array group table 201 holds records of array group information to enable de-duplication module 200 to locate which set of storage mediums 106 make up a certain array group. A volume table 202 holds records showing the relationship between each buffer and base volume and the array group which each volume was carved from. In addition, there is a set of tables for holding information for each buffer volume and each base volume, namely, a hash table, a bitmap table and a mapping table. Hash table 203, 206 holds hash values generated for each chunk for use in an initial comparison of new data to be stored with existing chunks. Bitmap table 204, 207 holds information regarding the location (e.g., logical block address) where each chunk is actually stored within the buffer or base volume. Mapping table 205, 208 holds mapping information for each logical block address (LBA) on the virtual volume and the actual storage location within the buffer or base volume. Each of these tables is described in greater detail below.

FIG. 3 illustrates an example data structure of array group table 201, which includes an array group ID 510, which provides identification of the array group. A medium ID 520 identifies each storage medium included in the array group. For instance, lines 591, 592 and 593 represent records which illustrates an array group "A1" is composed at least in part of storage mediums "M1", "M2" and "M3". Table 201 is referred to by de-duplication module 200 for determining which set of storage media 106 make up a certain array group 250.

FIG. 4 illustrates an example data structure of volume table 202, which includes a type 610, indicating the type of volume (i.e., whether the volume is used as buffer volume or base volume). Volume table 202 also includes a volume ID 620, indicating the identification of the volume, and an array group ID 630, indicating the identification of the array group from which the volume was originally carved. For instance, line 691 illustrates a record of a volume which is a "base volume" having "V1" as the volume ID and which was carved from an array group "A1". Also, line 692 illustrates a record for a "buffer volume" having "V2" as the volume ID and which was carved from an array group "A2". Table 202 is referred to by de-duplication module 200 to determine the origin array group of a volume, especially for a base volume when controlling the power supply to the volume, and can be used in conjunction with array group table 201 for determining storage mediums to which the power supply can be turned off.

FIG. 5 illustrates an example data structure of buffer volume hash table 203 and base volume hash table 206. Each hash table 203, 206 includes a hash value 710 field that indicates hash values generated from respective chunks by de-duplication module 200 during a data writing process or a flush process, as will be described in additional detail below, and a chunk ID 720 that identifies a chunk associated with the hash value. For instance, line 791 represents a record of a chunk which has "HV1" as the hash value and a chunk ID of "Ch1". On rare occasions, the same hash value can be generated from chunks having different actual data content. For example, chunks such as illustrated in line 792 for "Ch2" and line 793 for "Ch3" both are shown having the same hash value "HV2". Hash table 203, 206 is updated and referred to by de-duplication module for use in making an initial comparison between a chunk newly requested by client host to be stored and the existing chunks on the buffer or base volumes.

FIG. 6 illustrates an example data structure of bitmap table 204, 207, which includes a chunk ID field 810 for identification of a chunk. Also included are a start LBA 820, which gives the LBA on the volume of the starting address of the chunk, and a number of blocks field 830, which lists the number of valid blocks within the chunk. For instance, line 891 illustrates a record of a chunk which has "Ch1" as the chunk ID, which is stored from LBA "0" on the volume, and which includes "32" valid blocks from the beginning. During the de-duplication process data bytes of a write request will be broken down into chunks with having a maximum number of blocks (assumed to be 32 blocks in this example). However, the end portion of data to be might not to fit this boundary exactly, and thus there often will be less length than the maximum blocks in a chunk. So the number of blocks 830 illustrates the end point to which to compare data during the comparison process for de-duplication. Table 204, 207 is updated and referred to by de-duplication module 200 for accessing the content of each chunk during the comparison between a chunk newly-requested to be stored from the client host and existing chunks on the buffer or base volume.

FIG. 7 illustrates an example data structure of a mapping table 205, 208, which includes a LBA field 910 that indicates the LBA in a virtual volume where the client host intended the write data to be stored. Also included area a chunk ID 920 that identifies a chunk, and an offset 930 that indicates the offset number of blocks within the chunk where target blocks are stored on the volume. For instance, line 991 represents a record of a block which has been stored at a virtual volume LBA of "100" is actually stored on the chunk "Ch1" and the target block is placed in "0" offset. Also, line 992 illustrates LBA "101" in the virtual volume is mapped to the same chunk "Ch1" but in "1" block offset this time. These tables are updated and referred to by de-duplication module 200 when the client host makes a request for reading data stored to the buffer volume or the base volume. The de-duplication module will gather all blocks requested by the read request by referring to the mapping tables 205, 208.

Process to Write Data to the Buffer Volume

FIGS. 8A to 8C illustrate an exemplary embodiment of a process executed by de-duplication module 200 to write data to buffer volume 220. In summation, the process will: (a) break down the requested data into chunk-sized pieces; (b) compare the chunks by first using the hash value; (c) compare with actual chunk content when a matching hash value is found; (d) save a new chunk if the content is new; and (e) update the mapping table to map between the virtual volume LBA and actual location on the buffer volume. Thus, the exemplary process to write data to the buffer volume may include the following steps.

Step 1500: Set a variable "v_LBAonVVol" to the first LBA on the virtual volume specified by the client host on the data write command, where the variable "v_LBAonVVol" is the current LBA on the virtual volume. This variable is maintained by de-duplication module 200 for use during write and read operations.

Step 1510: Break down the data stream into the size of a chunk. For example, as discussed above, if a chunk is 32 blocks, then the write data is divided by starting a new chunk every 32 blocks. However, it is noted that the invention is not limited to chunks of any particular size.

Step 1520: Select for processing one chunk-sized portion of the divided data (potential new chunks) broken down in step 1510. If every potential new chunk of the new write data has already been processed, then the process ends; otherwise, the process goes to Step 1530.

Step 1530: Generate a hash value from the potential new chunk selected in Step 1520. The particular hash function used is not essential to the invention, and any of the various known hash functions, such as MD5, for instance, can be used.

Step 1540: Select any records from buffer hash table 203 which have the same hash value as the hash value generated in Step 1530 (i.e., the same hash value as the new data chunk). If there are no records that match the generated hash value, or if all of the records have already been processed, then a new chunk needs to be created and stored on the buffer volume, and the process goes to Step 1570 of FIG. 8B. Otherwise, if a matching hash value is found, the process proceeds to Step 1550 for direct comparison.

Step 1550: Get the start LBA and number of blocks of the target chunk (i.e., the chunk already stored that will be compared with the potential new chunk) from buffer bitmap table 204 by using chunk ID found in the selected record located in Step 1540. This information illustrates the place and length of the actual chunk content of the already stored chunk that has the same hash value as the potential new chunk.

Step 1560: Compare the potential new data chunk byte stream with the chunk found in Step 1550. If the byte pattern matches then proceed to Step 1610 otherwise proceed back to Step 1540. Various algorithms and/or hardware may be provided according to the invention for directly comparing the content of the two chunks with each other (i.e., byte-to-byte, bit-to-bit, or the like), and the invention is not limited to any particular method or apparatus for carrying out the direct comparison. If the direct comparison determines a match between the content of the two chunks, this means that the chunk previously stored on the buffer volume can be shared and that a new chunk does not have to be created and stored for the portion of the divided data (potential new chunk) being examined. Thus, the process only needs to create mapping information from the virtual volume LBA to the existing chunk in this case for the portion of the divided data (potential new chunk) being examined.

Step 1570: When it was determined at Step 1540 that a new chunk needs to be created, then the process adds a new chunk as illustrated in FIG. 8B. Thus, at Step 1570, the process obtains an empty chunk (unused chunk) with a chunk ID (or de-duplication module could create any unique ID for the new chunk) and a start LBA in the buffer volume for the new chunk. Provisioning the volume capacity for the respective chunk may be performed by various methods. For example, when the buffer volume is initially allocated the some or all of the entire capacity can be pre-divided into chunks according to a maximum block number size for a chunk. Then, each boundary address will be provided as the start LBA, one by one, when a new empty chunk is requested.

Step 1580: Store new data content of the new chunk into the place specified by the start LBA obtained in Step 1570 on the buffer volume.

Step 1590: Insert a new record into buffer hash table 203 with the hash value generated in Step 1530 and chunk ID obtained in Step 1570.

Step 1600: Insert a new record to buffer bitmap table 204 with the chunk ID and start LBA obtained in Step 1570 and the stored data content length for number of blocks.

As illustrated in FIG. 8C, Steps 1630 to 1680 create or update records for mapping table 205, according to the LBA on the virtual volume specified by the client host. For instance, from LBA 100 to 131, those records that show the mapping information between the virtual volume LBA and the place that the data is actually stored by using chunk ID 920 and the offset 930. Since this process is used in both the case in which a new chunk has been created, and also in the case in which a potential chunk is found to have content that matches with an existing chunk, Steps 1630 to 1680 are used in both cases.

Step 1610: In case that the potential new chunk matches an existing chunk on the buffer volume, the process sets variable "v_chunkID" to be the chunk ID of existing chunk. The variable "v_chunkID" is a variable maintained by de-duplication module 200 for tracking the chunk ID of a chunk currently being processed.

Step 1620: On the other hand in the case that the new chunk did not match any existing chunks, the process sets the variable "v_chunkID" to the chunk ID obtained in Step 1570.

Step 1630: Initialize variable "v_Offset" with 0. The variable "v_Offset" is a variable maintained by de-duplication module 200 for tracking the offset of a chunk currently being processed.

Step 1640: Select a record from buffer volume mapping table 205 where the LBA matches to the variable "v_LBAonVVol" (initially set in Step 1500). If the record already exists then the process skips to Step 1660 to change the mapping information. Otherwise, the process goes to Step 1650 first for creating a new record.

Step 1650: Insert a new record to buffer mapping table by putting "v_LBAonVVol" value to the "LBA" column of the new record.

Step 1660: For either the record found in Step 1640 or created in Step 1650, set "Chunk ID" 920 as the value of "v_chunkID" which was stored in either Step 1610 or Step 1620 depending on the case, and also set "Offset" as the value of "v_Offset" established in Step 1630.

Step 1670: Increment the value of "v_LBAonVVol" to the next LBA block and the value of "v_Offset" to the next block in the chunk.

Step 1680: If every block within the chunk has been mapped, then the process proceeds back to Step 1520 and checks for the next chunk of the new data. Otherwise, if all blocks remain for mapping, the process proceeds back to Step 1640 for updating the next record of buffer volume mapping table 205.

Process to Read Data

FIGS. 9 and 10 illustrate an example process to read data from either buffer volume 220 or base volume 230, as executed by de-duplication module 200. The process will (a) find out the volume where desired block has been stored; (b) if the target block is on the buffer volume, read the content from the buffer volume; (c) otherwise, if the target block is on the base volume, then the process turns on power to the storage devices making up the base volume and reads the content from the base volume, and (d) collect all blocks requested by the read request and return the data to the client host.

Step 1700: Set variable "v_LBAonVVol" to the first LBA on the virtual volume specified by the client host in the data read command.

Step 1710: Select a record from buffer mapping table 205 where the "LBA" matches to the variable "v_LBAonVVol". If the record exists, this means that the target block is stored on the buffer volume, and at Step 1720 the process proceeds to the subroutine "Read Block Data from Specific Volume" described below with respect to the FIG. 10. Otherwise, the target block is stored on the base volume and the process proceeds to Step 1730.

Step 1720: If the target block is stored in the buffer volume, the process jumps to the subroutine "Read Block Data from Specific Volume" to read block content from buffer volume, as illustrated in FIG. 10, for reading the specified block from the buffer volume.

Step 1730: Select record from Base Mapping Table 208 where the "LBA" matches to the variable v_LBAonVVol. This step is to find the chunk ID and the Offset where the target Block is stored in the base volume. (In the Step 1710 same information for the buffer volume is found if the record exists.)

Step 1740: If base volume 230 is powered off, then the process turns the power on for the storage mediums 106 making up the base volume. Determining which storage mediums 106 need to be turned ON may be performed by first referring to volume table 202 to find the array group ID for the base volume, and then referring to array group table 201 to determine the storage mediums 106 that make up the identified array group.

Step 1750: Once the base volume is powered on, the process jumps to the subroutine "Read Block Data from Specific Volume", as illustrated in FIG. 10, to read the block content from base volume 230.

Step 1760: Increment value of the variable "v_LBAonVVol" to the next LBA.

Step 1770: If all target blocks have been found, then the process proceeds to Step 1780. Otherwise, the process goes back to Step 1710 to collect the next block of the read request.

Step 1780: The collected blocks are returned to the client host in response to the read request.

Step 1790: If the base volume 230 was powered on for responding to the read request, then instructions are sent to turn OFF the storage mediums 106 making up the base volume 230.

FIG. 10 is a subroutine within the process of FIG. 9 to read data from the buffer volume or the base volume. Thus, the process of FIG. 10 reads block data from a specific volume (i.e., either from buffer volume 220 or base volume 230). Since there is no difference between the steps for the case of reading blocks from buffer volume and the case of reading blocks from the base volume, the steps illustrated in FIG. 10 apply to both cases. Before this subroutine was called, the record of mapping table 205, 208 which holds the Chunk ID 920 and Offset 930 for the target block was found in the prior steps (i.e., Step 1710 or 1730).

Step 1800: Get "Chunk ID" 920 and "Offset" value 930 from the selected record of mapping table 205, 208 selected in Step 1710 or 1730, respectively.

Step 1810: Select record from the respective bitmap table 204, 207 which has the same Chunk ID obtained in Step 1800.

Step 1820: Get "Start LBA" value from selected record of bitmap table 204, 207 in Step 1810 and add "Offset" value obtained in Step 1800. That will be the address of the target block on the specific volume, i.e., buffer volume or base volume.

Step 1830: Read data from the block of the calculated LBA as determined using the Offset. The data is read from the LBA and preferably stored in a cache, such as in memory 103 of controller 101, to be concatenated in the proper order with the remainder of the requested read data.

Process to Flush Buffer

FIGS. 11A to 11C illustrate an example process to flush buffered chunks on the buffer volume executed by de-duplication module 200. The process will: (1) turn on the base volume; (2) for each chunk buffered on the buffer volume, compare the hash value against the hash value of the chunks already stored on the base volume; (3) if a match is found, compare the content of the chunk with the actual content of the already stored chunk; (4) add the new chunk to the base volume if the new chunk from the buffer volume does not match any chunks on the base volume; (5) update the mapping table 208 for the base volume; (6) turn off base volume; and (7) initialize the buffer volume and related tables following the flush.

Step 1900: Turn on the storage mediums that are used to make up the base volume 230. For example, if the buffer volume is created from an array group, the storage mediums that make up that array group are powered on by controller 101.

Step 1910: Select a record from buffer hash table 203. If all records have been processed, then the process goes to Step 2070; otherwise the process to Step 1920 for processing the current record.

Step 1920: Search for and select any record from base hash table 206 having the same hash value as the record obtained in Step 1910 (the record selected from the buffer volume). If no records in the base hash table match the hash value of the current record selected from the buffer hash table, or if every record that does match has been processed, then the process goes to Step 1960 in FIG. 11B (i.e., the process needs to create a new chunk on the base volume); otherwise the process goes to Step 1930.

Step 1930: Get Start LBA 820 and Number of Blocks 830 from base bitmap table 207 from the record that has the same Chunk ID 810 as the record obtained from the base hash table in Step 1920.

Step 1940: In the same manner, get Start LBA 820 and Number of Blocks 830 from buffer bitmap table 204 from the record that has the same Chunk ID 810 as the record selected from the buffer hash table 203 in Step 1910.

Step 1950: Compare the content of chunks selected from the base volume (whose address was determined in Step 1930) and buffer volume (whose address was determined in Step 1940). As discussed above, any number of methods may be used for directly comparing the content of the chunks, such as bit-to-bit comparison, byte-to-byte, etc. If the content of the two chunks matches, then there is no need to store a new chunk, and the process proceeds to the Step 2010 of FIG. 11C for updating Mapping Table 208. Otherwise, if the content of the two chunks does not match, the process goes back to Step 1920 for comparison with any other matching hash values (usually a rare occurrence). If there are no other records in the base volume hash table 206 having hash values that match the hash value of the currently-selected chunk from the buffer volume, the process goes to step 1960 of FIG. 11B, which is described next (Steps 2070 to 2090 of FIG. 11A are described below).

Step 1960: Referring to FIG. 11B, the process obtains an empty chunk and the chunk ID of the selected empty chunk (or, alternatively, de-duplication module could create any unique ID to use as the chunk ID) and the Start LBA for the selected empty chunk on the base volume.

Step 1980: Copy data content of the buffer volume chunk (the Start LBA and Number of blocks of which were obtained in Step 1940) to the base volume empty chunk obtained in Step 1960.

Step 1990: Insert a new record into base volume hash table 206 with Hash Value 710 of the buffer volume record selected in Step 1910 (from buffer hash table 203) and chunk ID obtained in Step 1960.

Step 2000: Insert a new record into base bitmap table 207 with the Chunk ID and Start LBA obtained in Step 1960 and stored data content block length from Step 1980 for the number of blocks. The process then goes to FIG. 11C. FIG. 11C shows processing for updating the mapping table for two cases: (a) the case in which there was a chunk that matched a chunk already stored in the base volume; and (b) the case in which a new chunk has to be stored.

Step 2010: In the case in which the buffer volume chunk selected matches a base volume chunk already stored, the process sets the variable "v_BaseChunkID" to be the Chunk ID obtained in Step 1920. This is a variable maintained by de-duplication module 200.

Step 2020: On the other hand, in the case that the buffer volume chunk does not match any chunks already stored in the base volume, the process sets the variable "v_BaseChunkID" to the chunk ID obtained in Step 1960 (i.e., the new empty chunk ID).

Step 2030: Select records from buffer mapping table where "Chunk ID" is same as the record obtained in Step 1910 (from buffer hash table 203). If every record for the current chunk has been processed, then the process goes back to Step 1910 in FIG. 11A to process the next chunk on the buffer volume. Otherwise, the process continues to Step 2040. Further, Step 2030 will not always collect a number of records that is identical to the maximum number of blocks within a chunk. For example, during buffering of the chunks on the buffer volume, LBA 100, 101, 102 will be mapped by the chunk X, but some time later another chunk Y might over write part of this mapping information by updating mapping information of LBA 101, 102, 103. In this case only the record for LBA 100 has a chunk ID for chunk X. Thus, the result of Step 2030 may be a number of records less than the maximum possible. This is important since in Step 2060, described below, only valid mapping information of the base volume is updated.

Step 2040: Search for a record from base mapping table 208 where the "LBA" is same as the record selected in Step 2030. If the record already exists then the process goes to Step 2060 to change the mapping information for the located LBA. Otherwise, if a record does not already exist, the process goes to Step 2050 for creating new record.

Step 2050: Insert a new record to base mapping table 208 by adding the "LBA" value of the record selected in Step 2030.

Step 2060: For either the record found in Step 2040 or created in Step 2050, the process sets "Chunk ID" to be the value of "v_BaseChunkID" which was stored in either Step 2010 or Step 2020 depending on the case, and also sets "Offset" to be the value of the record selected in Step 2030 (i.e., the value that was stored on the buffer mapping table 205 for that record). Following completion of the 2060, the process goes back to step 2030 for processing of any more records from the buffer mapping table 205 having the same chunk ID as the selected record. When there are no more records, the process goes back to Steps 2070 to 2090 of FIG. 11A.

Step 2070: The process instructs the controller to turn off the storage mediums related to the base volume.

Step 2080: Shrink buffer volume to an initial size. In the preferred embodiment, a shrinkable volume is used for the buffer volume 220 in this invention. For example, allocation-on-use technology can be used to manage the size of the buffer volume, as taught in e.g., US Pat. Appl. Pub. 2004/0162958, to Kano et al., entitled "Automated On-Line Capacity Expansion Method for Storage Device", filed Feb. 23, 2004, the disclosure of which is incorporated herein by reference. Because all of the buffered chunks are merged into the base volume's capacity during the flush operation, the capacity of the buffer volume 220 can be greatly reduced to a suitable minimal initial capacity.

Step 2090: Delete the records on the buffer hash table 203, buffer bitmap table 204 and buffer mapping table 205 since all of the corresponding chunks on the buffer volume have been merged to the base volume 230.

Second Embodiments

In the first embodiments set forth above, the process for flushing buffered chunks from the buffer volume is triggered explicitly by the decision of the storage administrator or by some other triggering event, such as the passage of a predetermined period of time, the buffer volume reaching a predetermined size limit, or other such event. In the second embodiment described below, the buffer volume is flushed automatically whenever the process of reading data from the base volume is initiated, which may not occur very frequently in certain storage system environments. When any data read operation against the base volume takes place, the storage controller needs to turn on the base volume. Because the spin up of disk drives is the time during which proportionately the largest amount of power is required, it is desirable to not repeat turning on and off the disk arrays. Thus, this is also an efficient time to perform the buffer volume flush process, since energy has already been expended in the system power up. Most of the components and behaviors are the same as those described in the first embodiment. Thus, the differences are described below.

Process to Flush Buffer Along With Data Reading

FIG. 12 illustrates an example of a process to flush buffered chunks in conjunction with a data reading process executed by de-duplication module 200. Most of the process (i.e., Steps 1700 to 1780) is same as illustrated in FIG. 9 in first embodiment but its last part has little changed to call flush process. The flush process itself, as carried out in Step 2110 is no different from the process illustrated in FIGS. 11A to 11C in the first embodiments. Thus, only when to call the flush process is shown in the process illustrated in FIG. 12.

Step 2100: Following the return of the collected blocks in response to the read request in Step 1780, the process determines if the base volume is powered on? If the base volume is powered on (i.e., some data was read from the base volume), then the process goes to Step 2110 to flush the buffer. Otherwise, if the base volume was not powered on in response to the read request, then the process ends.

Step 2110: Flush of every buffered chunk on the buffer volume takes place as described above with respect to FIGS. 11A-11C in first embodiments.

Step 2120: Following the completion of the flush process, the process instructs the controller to turn OFF the storage mediums that are used to make up the base volume.

Third Embodiments

In the third embodiments, as illustrated in FIG. 13, a plurality of base volumes 230-1, 230-2 . . . 230-N are provided, each on a separate array group 250-1, 250-2 . . . 250-N. These embodiments might be applicable, for example, in a situation in which the number of stored chunks has become larger and larger, so that a plurality of base volumes might be needed to handle a huge amount of stored chunks. In a situation in which the base volume is very large, requiring a large number of storage devices, it is not power efficient to turn on the base volume during the flush and/or read processes if the new chunk copy can instead be performed against only one of plural base volumes having a proportionately smaller number of storage mediums and thus smaller energy usage. Therefore, the third embodiments describe an example of a method to turn on only the particular base volume that will be the target to copy buffered chunks at the particular time and keep remainder of the base volumes turned off. Most of the components and behaviors are same as described in the first embodiments. Accordingly, the differences are described below.

Logical Element Structure

FIG. 13 illustrates a software and logical element structure of the third embodiments. In the third embodiments there is a plurality of base volumes 230-1 . . . 230-N to handle storage of a large amount of chunks. Each base volume should belong to separate array group 250-1 . . . 250-N, respectively, which means that a separate set of storage mediums 106 is used for each base volume, so as to be able to control the power supply to each base volume independently. Furthermore, buffer volume is also configured on a separate array group 250-0, as in the first embodiments. It is assumed that only one buffer volume 220 is sufficient for the embodiment illustrated, although in other embodiments, multiple buffer volumes 220 might also be provided. During the flush process, chunks on the buffer volume 220 are merged to one or some of the base volumes 230, but typically not to all of them. With respect to the tables on the controller 101 used by de-duplication module 200, a different volume table 290 is provided, and multiples sets of base hash tables, base bitmap tables and base mapping tables are not required for the respective base volumes. Instead, modified base hash table 293 and base bitmap tables 292 hold integrated information of all base volumes 230. The base mapping table 208 of the first embodiments may be used in the present embodiments.

Data Structures

FIG. 14 illustrates an example data structure of a volume table 290 of the third embodiments. Every column 610, 620, 630 has the same meaning as described above with respect to FIG. 4 in the first embodiments. However there are plural records for base volumes in this embodiment. For instance, line 2292 is the record of base volume "V1" and at the same time table 290 shows there are other base volumes existing in the system, such as base volume "V2", as shown in record 2293

FIG. 15 illustrates an example data structure of a buffer volume hash table 291 and a base volume hash table 293 of this embodiment. Both buffer hash table 291 and base hash table 293 have same data structure, and are thus illustrated in a single figure. However usage of newly added column base volume ID 2330 is different between them, while the other columns 710 and 720 have the same meaning as described above with reference to FIG. 5 in the first embodiments.

Buffer hash table 291 uses base volume ID column 2230 for identification of the base volume that is storing a chunk that has the same Hash Value 710 as this record's buffer volume chunk. This information will be used during the flush process to select which base volumes to be powered on, since only the base volume 230 which will be used to compare with buffered chunks is turned on and the rest of base volumes are kept turned off in this embodiment. Base volume IDs are set during the data write process for writing data to the buffer volume if a hash valued for a buffered chunk has been stored on the base hash table already. Also, if a generated hash value for a new buffer volume chunk does not match any base hash table records then this value is set as NULL in base volume ID column 2330.

Base hash table 293 uses base volume ID column 2330 for identification of the particular base volume 230 where a corresponding chunk is stored. For instance, line 2391 represents a record of a chunk stored in a base volume that has "HV1" as the Hash Value 710 and a chunk ID 720 of "Ch1", while it is stored on the base volume "BV1". Further, it should be noted that plural chunks on the different base volumes 230 may have the same hash value in some instances. For example, lines 2392 and 2393 illustrate that they both have the same Hash Value "H2" and buffered chunk ID but their base volume ID, where possible matching chunks reside, are different as base volume IDs "BV3" and "BV5". Also, since having "NULL" value in the "base volume ID" column is a case specific to buffer hash table 291, this is not illustrated in FIG. 15.

FIG. 16 illustrates an example data structure of a base volume bitmap table 292 of this embodiment. The columns chunk ID 810 and number of blocks 830 have the same meanings as described above in the first embodiments. Furthermore, the data structure of buffer bitmap table 204 has no difference from that illustrated in the first embodiments. In FIG. 16, base bitmap table 292 includes a base volume ID column 2410 which provides identification of a base volume where the identified chunk has been stored. A start LBA column 2420 illustrates a start address of the identified chunk on the specific base volume. For instance, line 2491 represents a record of a chunk which has "Ch1" as its chunk ID 810, the chunk is stored starting at LBA "0" of the base volume "BV1", and the valid number of blocks is "32" blocks from the beginning. On the other hand, line 2493 also has "Start LBA" starting at "0" but this is for the base volume "BV3".

Process to Write Data to Buffer Volume

FIG. 17 illustrates an example process to write data to buffer volume 220 executed by de-duplication module 200. Most of the process uses the same steps as illustrated in FIGS. 8A, 8B and 8C of the first embodiments. Thus only the different portions need to be described, such as during the part of adding a new chunk after new data has been stored to an empty chunk on the buffer volume.

Steps 1500-1580 are the same as described above with respect to FIGS. 8A and 8B. Thus, an empty chunk has been obtained, and the content of the write data is stored to the empty chunk on the buffer volume 220.

Step 2500: The process searches for a record from base hash table 293 have a hash value that is the same as obtained in Step 1530 of FIG. 8A (i.e., a hash value generated from the new write data currently being examined). If no records having a matching hash value are found, then the process goes to Step 2530. Otherwise, if a matching hash value is found, the process goes to Step 2510.

Step 2510: Insert new record to buffer hash table 291 using the hash value generated in Step 1530, chunk ID obtained in Step 1570, and base volume ID obtained from the record selected in Step 2500.

Step 2520: If every record located in Step 2500 has been processed then the process goes to 1600. Otherwise, if there is another record in the base volume hash table that matches the hash value, the process goes back to Step 2500 to process the remaining records.

Step 2530: If no matching records were located in for the hash value in Step 2500, the process goes to step 2530 to insert a new record into buffer hash table 291 for the hash value generated in Step 1530, the chunk ID obtained in Step 1570, and using "NULL" for the base volume ID, thereby showing that no corresponding chunk having a same hash value has been stored previously on any of the base volumes.

Following completion of Step 2520 or Step 2530, the process goes to Step 1600 for inserting a new record in the buffer bitmap table 204, as described above in the first embodiment, and the remainder of the process is as described above in FIG. 8C.

Process to Read Data

FIGS. 18 and 19 illustrate an example of a process to read data from either the buffer volume 220 or one of the base volumes 230, as executed by de-duplication module 200. Many of the steps are the same as described above with respect to FIGS. 9 and 10.

Step 1700: Set variable "v_LBAonVVol" to the first LBA on the virtual volume specified by the client host in the data read command.

Step 1710: Select a record from buffer mapping table 205 where the "LBA" matches to the variable "v_LBAonVVol". If the record exists, this means that the target block is stored on the buffer volume, and at Step 1720 the process proceeds to the subroutine "Read Block Data from Specific Volume" described above with respect to FIG. 10. Otherwise, the target block is stored on the base volume and the process proceeds to Step 2600.

Step 1720: If the target block is stored in the buffer volume, the process jumps to the subroutine "Read Block Data from Buffer Volume" to read block content from buffer volume. This subroutine is the same as illustrated in FIG. 10, and as described above with respect to that figure for reading the specified block from the buffer volume.

Step 2600: If the target block is stored on one of base volumes 230, the process selects a record from base mapping table 208 where the "LBA" matches to the variable "v_LBAonVVol". This step is to find the chunk ID and the Offset where the target block is stored in the base volume.

Step 2610: Select "base volume ID" of the record from base bitmap table 292 where "chunk ID" 810 is the same as the value found in Step 2600.

Step 2620: If the storage mediums are powered off for the particular base volume 230 identified by the "base volume ID" located in Step 2610, then an instruction is sent to controller 101 to turn ON these storage mediums. To determine which storage mediums need to be turned ON, the process first refers to volume table 290 to find the particular array group ID for the particular base volume, and then the process finds the storage mediums that compose that particular array group from array group table 201.

Step 2630: Jump to the subroutine "Read Block Data from Base Volume" as illustrated in FIG. 19, to read block content from base volume. This subroutine is described in detail below with respect to FIG. 19.

Step 1760: Increment value of the variable "v_LBAonVVol" to the next LBA.

Step 1770: If all target blocks have been found, then the process proceeds to Step 1780. Otherwise, the process goes back to Step 1710 to collect the next block of the read request.

Step 1780: The collected blocks are returned to the client host in response to the read request.

Step 1790: If any of the base volumes 230 were powered ON for responding to the read request, then instructions are sent to turn OFF the storage mediums 106 making up the base volumes 230 that were powered on. In this embodiment only one or some of the plurality of base volumes might be turned on.

FIG. 19 is the subroutine carried out during Step 2630 within the process described above to read data from one of the base volumes. Steps 1800-1820 are the same as illustrated in FIG. 10 and as described above with respect to the first embodiment. Thus, only the last step, Step 2700 is different.

Step 2700: Once the process has determined the start LBA and added the offset to obtain the actual LBA on the particular base volume, the process reads the data from the block of the LBA calculated in Step 1820 from the particular base volume that is found in Step 2610 of FIG. 18.

Process to Flush Buffer

FIGS. 20A to 20D illustrate an example of a process to flush buffered chunks from the buffer volume in the third embodiments, as executed by de-duplication module 200. In the third embodiments, the process for turning on the base volume is different from the first embodiments since only the particular base volume having chunks needing to be compared with buffered chunks needs to be turned on. As discussed above, the flushing of the buffer volume may take place as a result of administrator direction or upon some other trigger event, such as the passage of a predetermined period of time, or the capacity of the buffer volume exceeding a predetermined amount.

Step 2800: Referring to FIG. 20A, the process selects a "base volume ID" from buffer hash table 291. This means the process selects the records showing that there are base volumes marked as candidates to have matching chunks. If the candidate base volume is powered on, then the process goes to Step 2820. Otherwise, the process goes to Step 2810 to power on the candidate base volume listed in the buffer hash table 291.

Step 2810: If the base volume specified by "base volume ID" of the record selected in Step 2800 is powered off then an instruction is sent to controller 101 to turn ON the candidate base volume.

Additionally, if one or more entries in buffer hash table 291 is "NULL", or if direct data comparison shows that a chunk is not already stored in any base volume, then that means one or more new chunks will need to be saved to a base volume, and a suitable base volume must be chosen. In this example, the least-utilized base volume is chosen to store new chunks (i.e., the base volume having the least amount of data currently stored therein), assuming that the base volumes are of about the same size. In other embodiments, the base volume having the largest remaining capacity might be chosen, such as when the base volumes differ substantially in total capacity. Alternative metrics might also be used for deciding which base volume should be used for storing new chunks. Steps 2820 to 2840 are directed locating the base volume having the lowest utilization.

Step 2820: Select "Volume ID" of the record from volume table where its Type 610 is "Base". If the utilization of every base volume in volume table 290 has already been checked, the process proceeds to Step 2850; otherwise the process proceeds to Step 2830.

Step 2830: Get used size of the selected base volume. The ability to obtain the amount of data already stored in a volume is an ability that is conventionally equipped on most storage systems.

Step 2840: If the size found in Step 2830 is the smallest one so far then the process holds the base volume ID as the candidate for storing new chunks.

Step 2850: If the base volume finally selected in the Step 2840 is not powered on then the process sends an instruction to turn this base volume on and set its Volume ID to the variable "v_LowUsageVol", which is a variable maintained by the de-duplication module 200. Steps 1910, 1920, 1940 and 2070-2090 during "comparing with hash values" and "comparing with chunk" are the same as described above with reference to FIG. 11A in first embodiments. Thus, only the different steps, Steps 2900 and 2910 are described below. In this embodiment, it is necessary to chose a specific base volume as the target during the process carried out for comparison of chunk contents.

Step 2900: Get start LBA 2420, number of blocks 830 and also base volume ID 2410 from base bitmap table 292 for the record having the same chunk ID as the record obtained in Step 1920.

Step 2910: Compare the content of the chunk in the buffer volume with the content of the chunk on the base volume, which is specified by the base volume ID found in Step 2900. If the content matches then proceed to the Step 2010 for updating Mapping Table 208. Otherwise, if the content does not match, then the process goes back to Step 1920 to compare against the next record. If there are no more records for comparison with this chunk, then the process goes to Step 3000 to add a new chunk. During the steps of adding a new chunk to the base volume, this embodiment will, in this example, use the lowest utilization volume selected in Steps 2820 to 2840 above.

Step 3000: Obtain an empty chunk and chunk ID (or de-duplication module could create any unique ID for the empty chunk) and its start LBA from the base volume specified by the variable "v_LowUsageVol" which was located and set in Step 2850.

Step 1980: Copy data content of the buffer volume chunk (the Start LBA and number of blocks of which were obtained in Step 1940) to the base volume empty chunk obtained in Step 3000.

Step 3010: Insert a new record into base hash table 293 with the Hash Value of the record selected in Step 1910 (from buffer hash table 293) and chunk ID obtained in Step 3000, and also the base volume ID from the variable "v_LowUsageVol".

Step 3020: Insert a new record into base bitmap table 292 with the chunk ID and Start LBA obtained in Step 3000 and the stored data content length obtained from Step 1980 for number of blocks, and also the base volume ID from the variable "v_LowUsageVol".

Finally, during the steps of updating the base mapping table 208, Steps 2010 and 2030-2060 are the same as described above with reference to FIG. 11C in the first embodiment except for Step 3100, as described below.

Step 3100: In the case in which the comparison of the chunk content in the Step 2910 did not match, the process sets the variable "v_BasechunkID" to the chunk ID obtained in Step 3000 above.

It should be noted that during a read request to one of the base volumes is not necessarily an efficient time to conduct a flush process in the third embodiments, since only one of the base volumes might be turned on in response to such a request, while the other base volumes might remain powered off. However, in an alternative to the process set forth above for the third embodiments, the flush process can be applied to just the chunks in the buffer volume that need to be compared only with chunks in the base volume that is turned on. If the chunk on the buffer volume is a new chunk, the new chunk can be stored in the turned on base volume, or marked for storage in another base volume the next time that other base volume is turned on.

Thus, it may be seen that this invention is used on storage systems which have a functionality of data de-duplication. Power supply for the base volume(s), i.e., storage mediums underlying the base volume(s), is normally turned off. Thus, in certain storage environments, the majority of the storage devices in the storage system will not usually be consuming power.

The invention may be particularly useful when incorporated in a storage system that uses a form of content-addressed storage (CAS), in which a storage location is associated with the actual content of the data being stored. Related art includes U.S. Pat. No. 6,807,632, to Carpentier et al., entitled "Content Addressable Information Encapsulation, Representation, and Transfer", the entire disclosure of which is incorporated herein by reference.

From the foregoing, it will be apparent that the invention provides methods and apparatuses for reducing the amount of data stored while also reducing power consumption. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A storage system comprising:
   a controller in communication with one or more first storage mediums and one or more second storage mediums;
   a first volume having storage capacity allocated from said one or more first storage mediums; and
   a second volume having storage capacity allocated from said one or more second storage mediums,
   wherein initially said one or more first storage mediums are configured in a powered on condition and said one or more second storage mediums are configured in a powered off condition,
   wherein write data received by said controller is stored to said first volume,
   wherein, while said one or more second storage mediums are configured in a powered on condition, a flush process is carried out whereby content of said write data stored in said first volume is compared with content of any existing data stored in said second volume, and
   wherein when results of the comparison show that the content of said write data does not match the content of said existing data, said write data is stored to said second volume.

2. A storage system according to claim 1,
   wherein when the results of the comparison show that the content of the write data does match the content of said existing data, a record is stored linking a logical block address of the write data with the existing data, and the write data is discarded.

3. A storage system according to claim 2,
   wherein, following storing of said write data to said second volume when the content does not match or storing of the record when the content does match, said one or more second storage mediums are powered off and the write data deleted from said first volume.

4. A storage system according to claim 1, further comprising:
   a virtual volume presented by said controller for receiving said write data as a target from a host computer, said write data targeting said virtual volume being initially stored to said first volume.

5. A storage system according to claim 1,
   wherein a first hash value is calculated for the content of said write data, and during said comparison, said first hash value is compared with second hash values calculated for the content of any existing data stored on said second volume to determine whether a direct comparison of the content of the write data with the existing data should be conducted.

6. A storage system according to claim 1,
   wherein data stored to said first volume is stored as chunks of a predetermined size,
   wherein data stored to said second volume is stored as chunks of said predetermined size,
   wherein said write data received by said controller is divided into divided portions, and content of each divided portion is compared with any existing chunks already stored on said first volume,
   wherein, for each divided portion, when results of said comparison of said divided portion show that the content of said divided portion does not match the content of said existing chunks on said first volume, said divided portion is stored to said first volume as a new chunk, and
   wherein when the results of the comparison of said divided portion show that the content of said divided portion does match the content of one of said existing chunks on said first volume, a record is stored linking a logical block address of the divided portion with the existing chunk on said first volume, and the divided portion is discarded.

7. A storage system according to claim 6,
   wherein a first hash value is calculated for the content of each said divided portion, and during said comparison of said divided portion, said first hash value is compared with second hash values calculated for the content of any existing data stored on said first volume to determine whether a direct comparison of the content of the write data with the existing data should be conducted.

8. A storage system according to claim 1,
   wherein said one or more second storage mediums are powered on in response to a read request received by said storage controller, and said flush process is initiated and said comparison takes place following completion of the read request.

9. A storage system according to claim 1,
   wherein said flush process is initiated by a triggering event including one of an instruction from an administrator, the first volume reaching a predetermined capacity, or passage of a predetermined period of time, and
   wherein said one or more second storage mediums are powered on in response to initiation of said flush process so that said comparison can be carried out.

10. A storage system according to claim 1,
    wherein there are a plurality of said first storage mediums, said first storage mediums being configured in a first array group, said first volume having storage capacity allocated from said first array group,
    wherein there are a plurality of said second storage mediums, said second storage mediums being configured in a second array group, said second volume having storage capacity allocated from said second array group, and
    wherein said second array group is configured to be powered on and off independently of said first array group by said controller.

11. A storage system according to claim 1, further comprising:
    one or more third storage mediums in communication with said controller; and
    a third volume having storage capacity allocated from said third array group,
    wherein when said controller determines that a first hash value calculated for the write data is the same as a second hash value calculated for existing data stored on one of said second volume or said third volume, the controller powers on the storage mediums for the one of said second or third volume in which the existing data having the matching hash value is stored to compare the content of the existing data with the content of the write data, while leaving the storage mediums for the other of the second or third volume powered off.

12. A storage system comprising:

a controller for controlling input/output (I/O) operations to a plurality of first storage mediums arranged in a first array group and to a plurality of second storage mediums arranged in a second array group;

a buffer volume having storage capacity allocated from said first array group, wherein data stored to said buffer volume is stored as chunks of a predetermined size;

a base volume having storage capacity allocated from said second array group, wherein data stored to said base volume is stored as chunks of said predetermined size; and a virtual volume presented by said controller as a target of the I/O operations, wherein said first storage mediums are initially in a powered on condition and said second storage mediums are in a powered off condition, wherein write data targeting said virtual volume received by said controller is initially stored to the buffer volume by dividing said write data into divided portions of said predetermined size for comparing content of each divided portion with content of any existing chunks already stored on said buffer volume, and storing the divided portion as a new chunk when the content of the divided portion does not match the content of any existing chunks, wherein, while said one or more second storage mediums are powered on, content of the chunks stored in said buffer volume is compared with content of any chunks stored in said base volume, and wherein when results of said comparison for each chunk of said buffer volume show that the content of the chunk of said buffer volume does not match the content of any of said chunks on said base volume, the chunk from the buffer volume is stored to said base volume.

13. A storage system according to claim 12, wherein when the results of the comparison of the chunks show that the content of the chunk of the buffer volume data does match the content of any chunks on the base volume, a record is stored linking a logical block address of the chunk on the buffer volume with a matching existing chunk on the base volume, and the chunk on the buffer volume is discarded.

14. A storage system according to claim 13, wherein following the comparison of the chunks in said buffer volume with the content of any existing chunks stored in said base volume, and storing of said chunks to said base volume in the case that the content does not match or storing of the record in the case that the content does match, said one or more second storage mediums are powered off and the chunks deleted from said buffer volume.

15. A storage system according to claim 12, wherein first hash values are calculated for the content of said chunks on said buffer volume, and during said comparison of chunks, said first hash values are compared with second hash values previously calculated for the content of any existing chunks stored on said base volume to determine whether a direct comparison of the content of the chunks on the buffer volume with the chunks on the base volume should be conducted.

16. A storage system according to claim 12, wherein said base volume is a first base volume of a plurality of base volumes, said storage system further comprising:

a plurality of third storage mediums arranged in a third array group, said controller controlling I/O operations to said third storage mediums; and a second base volume of said plurality of base volumes having storage capacity allocated from said third array group, wherein data stored to said second base volume is stored as chunks of said predetermined size, wherein when said controller determines that a first hash value calculated for one of the chunks on said buffer volume is the same as a second hash value previously calculated for an existing chunk stored on one of said first base volume or said second base volume, the controller powers on the storage mediums for the one of said first base volume or said second base volume in which the existing chunk having the matching hash value is stored to compare the content of the existing chunk with the content of the chunk on the base volume, while leaving the storage mediums for the other of the first base volume or the second base volume powered off.

17. A storage system comprising:

a controller in communication with one or more first storage mediums, one or more second storage mediums, and one or more third storage mediums;

a first volume having storage capacity allocated from said one or more first storage mediums;

a second volume having storage capacity allocated from said one or more second storage mediums;

a third volume having storage capacity allocated from said one or more third storage mediums; and wherein said one or more first storage mediums are initially in a powered on condition and said one or more second storage mediums and said one or more third storage mediums are in a powered off condition, wherein write data received by said controller is initially stored to said first volume, wherein when said controller determines that a first hash value calculated for the write data is the same as a second hash value calculated for existing data stored on one of said second volume or said third volume, the controller is configured to power on the storage mediums for the one of said second or third volume in which the existing data having the matching hash value is stored to compare the content of the existing data with the content of the write data, while leaving the storage mediums for the other of the second or third volume powered off.

18. A storage system according to claim 17, wherein when results of the comparison show that the content of said write data does not match the content of said existing data, said write data is stored to the one of said second volume or third volume having a largest remaining available capacity.

19. A storage system according to claim 17, wherein when the results of the comparison show that the content of the write data does match the content of said existing data, a record is stored linking a logical block address of the write data with the existing data, and the write data is discarded.

20. A storage system according to claim 17, wherein data stored to said first volume is stored as chunks of a predetermined size, wherein data stored to said second volume and said third volume is stored as chunks of said predetermined size, wherein said write data received by said controller is divided into divided portions, and content of each divided portion is compared with any existing chunks already stored on said first volume, wherein, for each divided portion, when results of said comparison of said divided portion show that the content of said divided portion does not match the content of said existing chunks stored on said first volume, said divided portion is stored to said first volume as a new chunk, and wherein when the results of the comparison of said divided portion show that the content of said divided portion does match the content of one of said existing chunks on said first volume, a record is stored linking a logical block address of the divided portion with the existing chunk on said first volume, and the divided portion is discarded.

* * * * *